United States Patent
Ke

(10) Patent No.: US 12,010,612 B2
(45) Date of Patent: Jun. 11, 2024

(54) METHOD FOR CONTROLLING NETWORK ACCESS AND COMMUNICATIONS DEVICE

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 438 days.

(21) Appl. No.: 17/331,547

(22) Filed: May 26, 2021

(65) Prior Publication Data

US 2021/0289434 A1   Sep. 16, 2021

Related U.S. Application Data

(63) Continuation of application No. PCT/CN2019/122635, filed on Dec. 3, 2019.

(30) Foreign Application Priority Data

Dec. 4, 2018 (CN) .......................... 201811476264.9

(51) Int. Cl.
*H04W 48/18* (2009.01)
*H04W 68/00* (2009.01)
*H04W 76/15* (2018.01)

(52) U.S. Cl.
CPC ......... *H04W 48/18* (2013.01); *H04W 68/005* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 9,307,034 B1 | 4/2016 | Keyani et al. | |
| 2012/0142358 A1 | 6/2012 | Ishihara | |
| 2015/0382393 A1* | 12/2015 | Kiss | H05K 999/99 370/328 |
| 2018/0220364 A1 | 8/2018 | Li et al. | |
| 2018/0227873 A1 | 8/2018 | Vrzic | |
| 2018/0317157 A1 | 11/2018 | Baek | |
| 2018/0376445 A1 | 12/2018 | Yoon et al. | |
| 2019/0182718 A1* | 6/2019 | Shan | H04W 8/06 |

(Continued)

FOREIGN PATENT DOCUMENTS

| | | |
|---|---|---|
| CA | 3 025 961 A1 | 12/2017 |
| CN | 101489279 A | 7/2009 |

(Continued)

OTHER PUBLICATIONS

Huawei et al., "OI#4h: TS 23.501: Selection of a Target AMF supporting the Network Slices due to UE mobility," SA WG2 Meeting #124, S2-178399, pp. 1-6, (Nov. 27-Dec. 1, 2017).

(Continued)

*Primary Examiner* — Eunsook Choi
(74) *Attorney, Agent, or Firm* — Brooks Kushman P.C.

(57) ABSTRACT

Embodiments of this disclosure provide a method for controlling network access and a communications device. The method includes: determining whether a preset condition is satisfied; and when it is determined that the preset condition is satisfied, performing a first operation of accessing a second network through a first network.

20 Claims, 10 Drawing Sheets

(56) References Cited

U.S. PATENT DOCUMENTS

| | | | |
|---|---|---|---|
| 2019/0254118 A1* | 8/2019 | Dao | H04L 67/141 |
| 2019/0261453 A1* | 8/2019 | Jain | H04W 8/08 |
| 2019/0357129 A1 | 11/2019 | Park et al. | |
| 2020/0084711 A1 | 3/2020 | Liu et al. | |
| 2020/0084744 A1* | 3/2020 | Youn | H04W 76/30 |
| 2020/0329450 A1* | 10/2020 | Youn | H04W 68/005 |
| 2021/0045050 A1 | 2/2021 | Li et al. | |
| 2021/0168610 A1* | 6/2021 | Adrangi | H04W 12/069 |

FOREIGN PATENT DOCUMENTS

| | | |
|---|---|---|
| CN | 103634929 A | 3/2014 |
| CN | 108156645 A | 6/2018 |
| CN | 108347752 A | 7/2018 |
| CN | 108848112 A | 11/2018 |
| CN | 110351725 A | 10/2019 |
| EP | 3 544 337 A1 | 9/2019 |
| JP | 2012124660 A | 6/2012 |
| WO | 2018/073572 A1 | 4/2018 |
| WO | 2018093168 A1 | 5/2018 |
| WO | 2018097599 A1 | 5/2018 |
| WO | 2018199649 A1 | 11/2018 |

OTHER PUBLICATIONS

CN Office Action dated Oct. 20, 2020 as received in Application No. 201811476264.9.
Written Opinion of the International Searching Authority dated Jun. 17, 2021 as received in Application No. PCT/CN2019/122635.
European Search Report dated Jan. 3, 2022 as received in application 19892515.8.
JP Office Action dated Jul. 19, 2022 as received in Application No. 2021-531403.
"TS 23.501: Routing NSSAI perform AMF selection by (R)AN" SA WG2 Meeting #122, S2-174340, Jun. 26, 2017, Huawei, HiSilicon.
SG Office Action dated Apr. 21, 2023 as received in Application No. 11202105415S.

* cited by examiner

METHOD FOR CONTROLLING NETWORK ACCESS AND COMMUNICATIONS DEVICE

CROSS-REFERENCE TO RELATED APPLICATIONS

This application is a continuation application of PCT International Application No. PCT/CN2019/122635 filed on Dec. 3, 2019, which claims priority to Chinese Patent Application No. 201811476264.9, filed in China on Dec. 4, 2018, both disclosures of which are incorporated herein by reference in their entireties.

TECHNICAL FIELD

This disclosure relates to the field of communications technologies, and in particular, to a method for controlling network access and a communications device.

BACKGROUND

In a 5G communications system, some terminals support access to multiple networks, for example, a first network and a second network, and further, may support access to the second network through the first network, for example, access to a public network through a non-public network. However, the terminals do not support access to the second network through the first network.

SUMMARY

Some embodiments of this disclosure provide a method for controlling network access and a communications device, to resolve a problem that a terminal does not support access to a second network through a first network.

According to a first aspect, some embodiments of this disclosure provide a method for controlling network access, applied to a first communications device, where the method includes:
  determining whether a preset condition is satisfied; and
  when it is determined that the preset condition is satisfied, performing a first operation of accessing a second network through a first network.

According to a second aspect, some embodiments of this disclosure provide a method for controlling network access, applied to a second communications device, and including:
  determining whether a preset condition is satisfied; and
  when it is determined that the preset condition is satisfied, performing a second operation of accessing a second network through a first network.

According to a third aspect, some embodiments of this disclosure provide a method for controlling network access, applied to a third communications device, and including:
  obtaining second information; and
  performing, based on the second information, a third operation of accessing a second network through a first network,
  where the second information includes at least one of the following: information about the second network, first indication information, NAS information, second NAS information, a paging message, a second paging message, request information for establishing a second SRB, request information for establishing a second DRB, data in the second SRB, data in the second DRB, and data in a second NG connection,
  where the first indication information includes at least one of the following: first routing indication information, non-second routing indication information, second routing indication information, and non-first routing indication information.

According to a fourth aspect, some embodiments of this disclosure provide a method for controlling network access, applied to a fourth communications device and including:
  obtaining third information; and
  performing, based on the third information, a fourth operation of accessing a second network through a first network,
  where the third information includes at least one of the following: information about the second network, first indication information, NAS information, a paging message, a second paging message, configuration information of an SRB, configuration information of a second SRB, configuration information of a DRB, configuration information of a second DRB, data in the second SRB, and data in the second DRB,
  where the first indication information includes at least one of the following: first routing indication information, non-second routing indication information, second routing indication information, and non-first routing indication information.

According to a fifth aspect, some embodiments of this disclosure provide a first communications device, including:
  a first determining module, configured to determine whether a preset condition is satisfied; and
  a first execution module, configured to: when it is determined that the preset condition is satisfied, perform a first operation of accessing a second network through a first network.

According to a sixth aspect, some embodiments of this disclosure provide a second communications device, including:
  a second determining module, configured to determine whether a preset condition is satisfied; and
  a second execution module, configured to: when it is determined that the preset condition is satisfied, perform a second operation of accessing a second network through a first network.

According to a seventh aspect, some embodiments of this disclosure provide a third communications device, including:
  a first obtaining module, configured to obtain second information; and
  a third execution module, configured to perform, based on the second information, a third operation of accessing a second network through a first network,
  where the second information includes at least one of the following: information about the second network, first indication information, NAS information, second NAS information, a paging message, a second paging message, request information for establishing a second SRB, request information for establishing a second DRB, data in the second SRB, data in the second DRB, and data in a second NG connection,
  where the first indication information includes at least one of the following: first routing indication information, non-second routing indication information, second routing indication information, and non-first routing indication information.

According to an eighth aspect, some embodiments of this disclosure provide a fourth communications device, including:
  a second obtaining module, configured to obtain third information; and a fourth execution module, configured to perform, based on the third information, a fourth operation of accessing a second network through a first network, where the third information includes at least one of the following: information about the second network, first indication information, NAS information, a paging message, a second paging message, configuration information of an SRB, configuration information of a second SRB, configuration information of a DRB, configuration information of a second DRB, data in the second SRB, and data in the second DRB, where the first indication information includes at least one of the following: first routing indication information, non-second routing indication information, second routing indication information, and non-first routing indication information.

According to a ninth aspect, some embodiments of this disclosure provide a communications device, including a memory, a processor, and a program stored in the memory and capable of running on the processor, where when the program is executed by the processor, the steps of the method for controlling network access according to the first aspect in some embodiments of this disclosure are implemented, or the steps of the method for controlling network access according to the second aspect in some embodiments of this disclosure are implemented, or the steps of the method for controlling network access according to the third aspect in some embodiments of this disclosure are implemented, or the steps of the method for controlling network access according to the fourth aspect in some embodiments of this disclosure are implemented. Optionally, the communications device may be a first communications device, a second communications device, a third communications device, or a fourth communications device.

According to a tenth aspect, some embodiments of this disclosure provide a computer-readable storage medium, where a computer program is stored in the computer-readable storage medium, and when the computer program is executed by a processor, the steps of the method for controlling network access according to the first aspect in some embodiments of this disclosure are implemented, or the steps of the method for controlling network access according to the second aspect in some embodiments of this disclosure are implemented, or the steps of the method for controlling network access according to the third aspect in some embodiments of this disclosure are implemented, or the steps of the method for controlling network access according to the fourth aspect in some embodiments of this disclosure are implemented.

In some embodiments of this disclosure, the first network can be distinguished from the second network, the second network or a proxy network element can be selected for the terminal, resources can be configured for the terminal to access the first network and the second network, and information between the terminal and the first network and related information between the terminal and the second network can be routed in the first network, so that the terminal can access the second network and a second network service through the first network.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
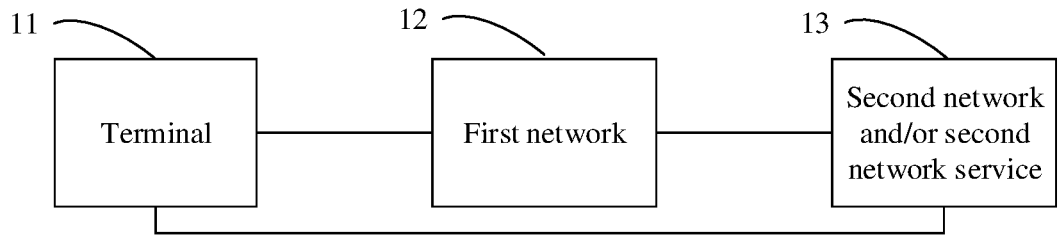
FIG. 1 is a schematic diagram of a network system structure to which some embodiments of this disclosure may be applied.

It is first pointed out that network services may include network services and network features at an application layer. Unlike type B network services, type A network services cannot be accessed before an access network establishes a data channel for a terminal.

The type A network services may include, but are not limited to, IMS voice, local area network (LAN) services, multimedia broadcast multicast service (MBMS), public warning system (PWS), and user plane location services.

The type B network services may include, but are not limited to, CSFB (CS FallBack) circuit-switched fallback, EPS PB (EPS (Evolved Packet System) FallBack, EPS fallback), and SMS (Short Messaging Service).

Generally speaking, network services can only be accessed by accessing a network that provides the network services. A non-public network (non-public net for short) may be deployed in multiple manners, such as (1) an independent network; and (2) a non-independent network, for example, (a) a part of an operator communication network and (b) a slice of an operator communication network.

With introduction of non-public networks (non-public nets for short), a non-public net often only provides services within one area, such as only a factory area or an office building, rather than in all areas. When moving out of a service range of the non-public net, a registered terminal of the non-public net is unable to access the network services of the non-public net (non-public net services for short). If the terminal also registers with a public net, the terminal can access the non-public net services through the public net.

For the type A network services, (1) if a terminal can access a public net service through a non-public net, it means that the terminal can establish both a protocol data unit (PDU) session for a public net service and a PDU session for a non-public net service on the non-public net; and (2) if a terminal can access a non-public net service through a public net, it means that the terminal can establish both a PDU session for a public net service and a PDU session for a non-public net service on the public net.

For the type B network services, when a terminal requests access to a second network for a first service, the second network needs to verify whether the terminal is allowed to access the first service through the second network.

Similarly, although a public network (public net for short) has full coverage, there are still some coverage holes. If these coverage holes happen to be covered by a non-public net, and a terminal registered with the public net is also registered with the non-public net, the terminal can access a public net service through the non-public net.

To enable access of a network service of one network through another network, the following problems need to be resolved:

Problem 1: When a terminal accesses a second network through a first network, different terminals may need to access different second networks, but it is not clear how a first-network RAN network element chooses a second network or a proxy network element.

Problem 2: When only one RRC connection is established between the terminal and the first network, the first-network RAN network element needs to route NAS information of the two networks to the two networks, but the NAS (Non-access stratum) information is transparent to the first-network RAN network element, and therefore the first-network RAN network element does not know how to route the NAS information of the two networks. When the first-network RAN network element needs to configure DRBs for data of the two networks, the terminal is not clear about which DRB is used to transmit which network information. Therefore, how to distinguish related information of a first network (for example, NAS information of the second network and a DRB established for accessing the second network) and related information of a second network, and how to choose the second network or a proxy network element between the first network and the second network are problems to be resolved by the embodiments of this disclosure.

Optionally, obtaining may be understood as obtaining from a configuration, obtaining through receiving, obtaining through receiving after a request is sent, obtaining through self-learning, obtaining based on unreceived information, or obtaining through processing based on received information. This may be specifically determined according to actual needs, and is not limited in the embodiments of this disclosure. For example, when indication information of a capability transmitted by a device is not received, it may be deduced that the device does not support the capability.

Optionally, transmission may include broadcast, broadcast in a system message, and returning in response to a request.

In some embodiments of this disclosure, a non-public net service is short for a non-public network service. The non-public network service may also be referred to as one of the following: a non-public network-based network service, a non-public communication service, a non-public network communication service, a non-public network-based network service, or other names. It should be noted that a naming manner is not specifically limited in some embodiments of this disclosure. In an implementation, the non-public net is a closed access group (CAG). In this case, the non-public network service is a network service of the closed access group.

In some embodiments of this disclosure, the non-public network service may include or may be referred to as a private network service. The private network service may be referred to as one of the following: a private network-based network service, a private communication service, a private network service, a private net service, a local area network (LAN) service, a private virtual network (PVN) service, an isolated communication network service, a dedicated communication network service, a dedicated network service, or other names. It should be noted that a naming manner is not specifically limited in some embodiments of this disclosure.

In some embodiments of this disclosure, the first network may be a public net, and the second network may be a non-public net; or the first network may be a non-public net, and the second network may be a public net; or the first network may be a first non-public net, and the second network may be a second non-public net; or the first network may be a first public net, and the second network may be a second public net.

In some embodiments of this disclosure, a non-public net is short for a non-public network. The non-public network may be referred to as a non-public communication network. The non-public net may include at least one of the following deployment modes: a physical non-public net, a virtual non-public net, and a non-public net implemented on a public net. In an implementation, the non-public net is a closed access group (CAG). One CAG may include a group of terminals.

In some embodiments of this disclosure, the non-public network may include or may be referred to as a private network. The private network may be referred to as one of the following: a private communication network, a private net, a local area network (LAN), a private virtual network (PVN), an isolated communication network, a dedicated communication network, or other names. It should be noted that a naming manner is not specifically limited in some embodiments of this disclosure.

In some embodiments of this disclosure, a public net service is short for a public network service. The public network service may also be referred to as one of the following: a public network-based network service, a public communication service, a public network communication service, a public net-based network service, or other names. It should be noted that a naming manner is not specifically limited in some embodiments of this disclosure.

In some embodiments of this disclosure, a public net is short for a public network. The public network may be referred to as a public communication network or other names. It should be noted that a naming manner is not specifically limited in some embodiments of this disclosure.

In some embodiments of this disclosure, a channel includes at least one of the following: a PDU session, a quality of service (QoS) flow, an evolved packet system (EPS) bearer, a packet data protocol (PDP) context, a DRB, an SRB, and a network security protocol (IPsec) association.

In some embodiments of this disclosure, related information between the terminal and the second network (which may be referred to as data of the second network) may include at least one of the following: control information between the terminal and the second network (the control information may be referred to as control signaling), a second paging message, and user plane data between the terminal and the second network.

In some embodiments of this disclosure, control signaling between a terminal and a network (for example, a core network of the network) is referred to as NAS information. The NAS information may be referred to as one of the following: NAS signaling, NAS stratum information, and control signaling. Standard organizations such as 3GPP may refer to the NAS information as other names, and this does not affect implementation of this disclosure.

In some embodiments of this disclosure, control information between a terminal and a first network (for example, a core network of the first network) is referred to as first NAS information. User plane data between the terminal and the second network is referred to as second data. Control information between the terminal and the second network (for example, a core network of the second network) is referred to as second NAS information. User plane data between the terminal and the second network is referred to as second data.

In some embodiments of this disclosure, the NAS information may include at least one of the following: a Dedicated NAS-Message and a NAS-PDU. The dedicated NAS message can be used to transmit UE specific NAS layer information between a 5GC CN network element and UE. The RRC layer is transparent for this information. The NAS-PDU may be included in a 5GC-to-UE or UE-to-5GC message, and the NAS-PDU is transmitted to a RAN network element without interpretation by the RAN network element.

In some embodiments of this disclosure, NAS information between a terminal and a first network is referred to as first NAS information. NAS information between the terminal and a second network is referred to as second NAS information. Second NAS signaling may include data in an IPsec channel (for example, an IPsec security association) that carries the second NAS signaling. Second data may include data in an IPsec channel that carries the second data. The IPsec channel includes IPsec SA (Security Association) data. The IPsec SA that carries the second NAS signaling may be a primary IPsec SA. The IPsec SA that carries the second NAS signaling may be a secondary IPsec SA.

In some embodiments of this disclosure, a first DRB is related to the first network. The first DRB may be one of the following: a DRB, of a first-network RAN network element, used for the terminal to interact with the first network, a DRB, of the first-network RAN network element, used to transmit related information between the terminal and the first network, and a DRB, of the first-network RAN network element, used to transmit related control signaling (for example, NAS information) between the terminal and the first network.

A second DRB is related to the second network. The second DRB may be one of the following: a DRB, of a first-network RAN network element, used for the terminal to interact with the second network, a DRB, of the first-network RAN network element, used to transmit related information between the terminal and the second network, and a DRB, of the first-network RAN network element, used to transmit related control signaling (for example, NAS information) between the terminal and the second network.

In some embodiments of this disclosure, a first SRB may be one of the following: an SRB, of a first-network RAN network element, used for the terminal to interact with the first network, an SRB, of the first-network RAN network element, used to transmit related information between the terminal and the first network, and an SRB, of the first-network RAN network element, used to transmit related control signaling (for example, NAS information) between the terminal and the first network. A second SRB may be one of the following: an SRB, of a first-network RAN network element, used for the terminal to interact with the second network, an SRB, of the first-network RAN network element, used to transmit related information between the terminal and the second network, and an SRB, of the first-network RAN network element, used to transmit related control signaling (for example, NAS information) between the terminal and the second network.

In some embodiments of this disclosure, a first next generation (NG) connection is a control plane connection, for a terminal, between first-network elements. The first-network elements are specifically network elements of the first network. For example, a control plane connection, for a terminal, between a first-network RAN network element and a first-network CN network element (for example, an AMF) may be referred to as a first NG interface or the first NG connection.

A second NG connection may be a control plane connection, for a terminal, between a first-network element and a second-network element or a proxy network element. The second-network element is specifically a network element of the second network. For example, a control plane connection, for a terminal, between a first-network RAN network element and a second-network CN network element or a proxy network element (for example, an AMF) may be referred to as a second NG interface or the second NG connection.

A third NG connection may be a control plane connection, for the terminal, between a second-network element and a proxy network element. The second-network element is specifically a network element of the second network. For example, a control plane connection, for a terminal, between a second-network CN network element and a proxy network element may be referred to as a third NG interface or the third NG connection.

In an implementation, a paging message may be a notification message.

In an implementation, the paging message includes first information.

A first paging message may be a paging message of the first network or a paging message triggered by a network element of the first network. The second paging message may be a paging message of the second network or a paging message triggered by a network element of the second network.

In some embodiments of this disclosure, an NG interface may also be referred to as an Si interface or an N2 interface. The names are not limited.

In some embodiments of this disclosure, a network element includes at least one of the following: a core network element and a radio access network element.

In some embodiments of this disclosure, the network element of the first network (or referred to as the first-network element) includes at least one of the following: a core network element of the first network and a radio access network element of the first network. The network element of the second network (or referred to as the second-network element) includes at least one of the following: a core network element of the second network and a radio access network element of the second network.

In some embodiments of this disclosure, a core network element (CN network element) may include, but is not limited to, at least one of the following: a core network device, a core network node, a core network function, a core network element, a mobility management entity (MME), an access management function (AMF), a session management function (SMF), a user plane function (UPF), a serving gateway (SGW), a PDN gateway (PDN Gate Way), a policy control function (PCF), a policy and charging rules function (PCRF), a serving GPRS support node (SGSN), a gateway GPRS support node (GGSN), and a radio access network device.

In some embodiments of this disclosure, a RAN network element may include, but is not limited to, at least one of the following: a radio access network device, a radio access network node, a radio access network function, a radio access network unit, a 3GPP radio access network, a non-3GPP radio access network, a centralized unit (CU), a distributed unit (DU), a base station, an evolved NodeB (eNB), a 5G base station (gNB), a radio network controller (RNC), a NodeB, a non-3GPP interworking function (N3IWF), an access controller (AC) node, an access point (AP) device, a wireless local area network (WLAN) node, or N3IWF.

A base station may be a base transceiver station (BTS) in GSM or CDMA, or may be a NodeB in WCDMA, or may be an evolved NodeB (eNB or e-NodeB) in LTE, or a 5G NodeB (gNB), which is not limited in some embodiments of this disclosure.

In some embodiments of this disclosure, a terminal may include a relay that supports a terminal function or a terminal that supports a relay function. The terminal may also be referred to as a terminal device or user equipment (UE). The terminal may be a terminal side device such as a mobile phone, a tablet computer (Tablet Personal Computer), a laptop computer, a personal digital assistant (PDA), a mobile Internet device (MID), a wearable device, or an in-vehicle device. It should be noted that the specific type of the terminal is not limited in some embodiments of this disclosure.

FIG. 1 is a schematic structural diagram of a network system to which some embodiments of this disclosure may be applied. As shown in FIG. 1, the network system includes a terminal 11, a first network 12, a second network and/or a second network service 13. The second network service may be a network service supported by a network element of the second network or a network service accessed through the second network. The terminal 11 may access the second network service through the first network 12, or access the second network service through the second network, or after accessing the second network through the first network, access the second network service through the second network.

Figure 2A:
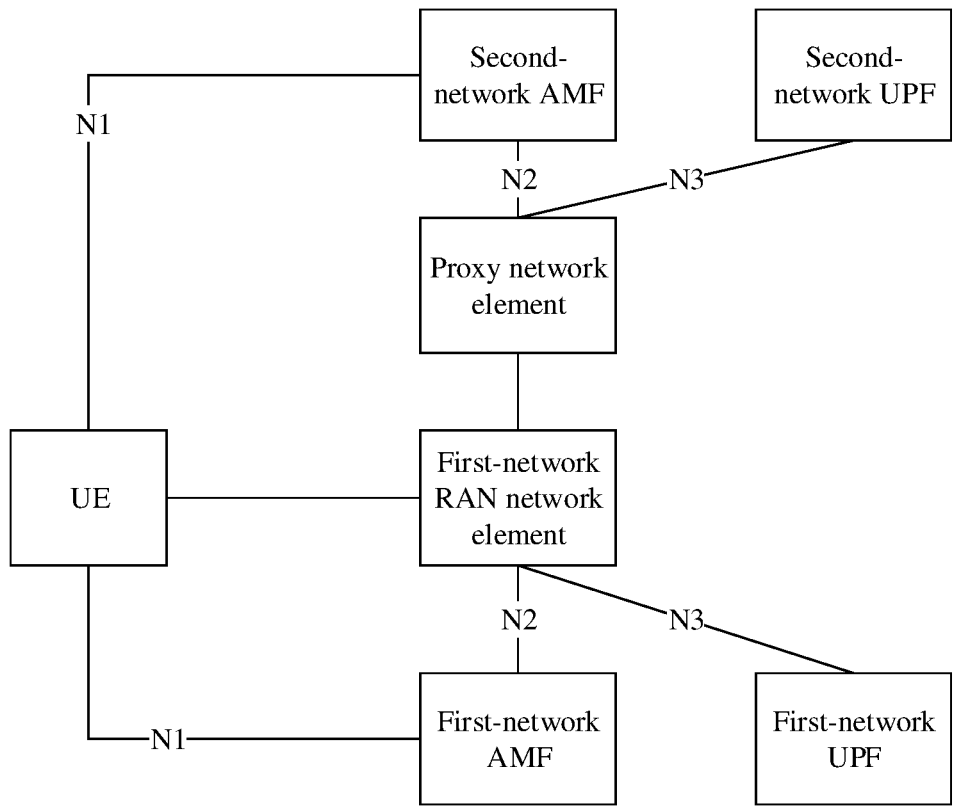
FIG. 2A, FIG. 2B, and FIG. 2C are optional schematic diagrams of the network system structure in FIG. 1.
Figure 2B:
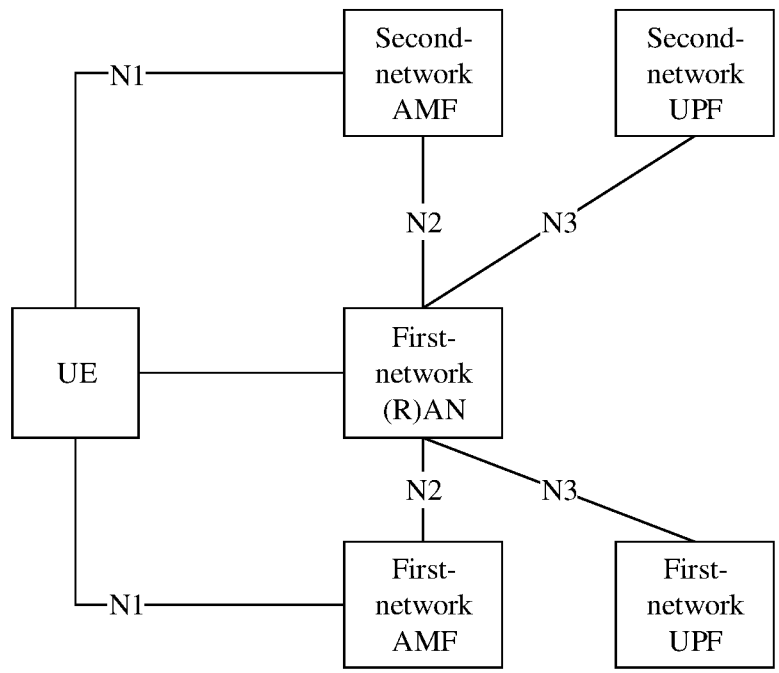

In an optional implementation, the schematic structural diagram of the network system may be shown in FIG. 2A and FIG. 2B, and the terminal may interact with the first network (for example, a first-network AMF or a first-network UPF) and the second network (for example, a second-network AMF or a second-network UPF) through a first-network RAN network element. When the terminal interacts with the second network through the first-network RAN network element, the terminal may interact with the second network through a proxy network element (as shown in FIG. 2A) or directly interact with the second network (as shown in FIG. 2B).

Figure 2C:
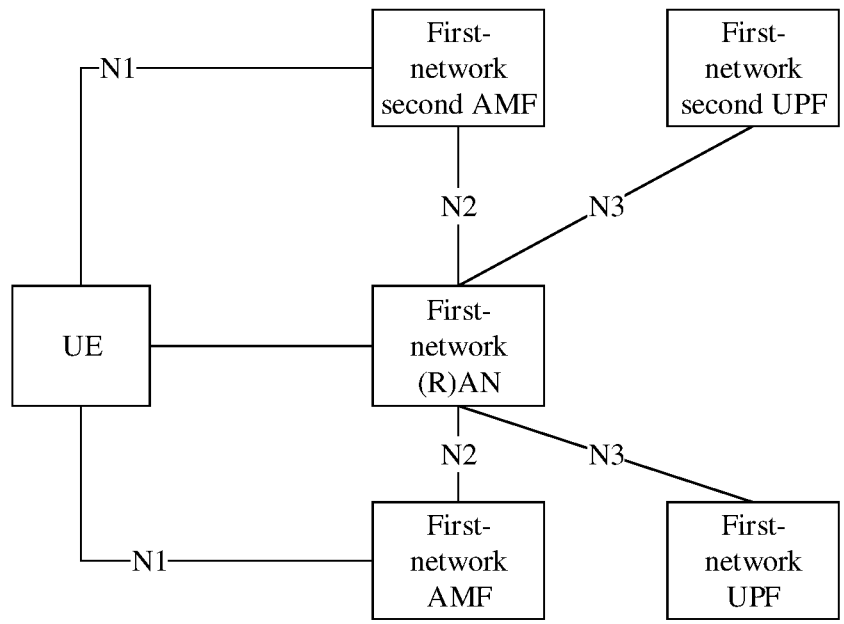

In another optional implementation, the second network is a part of the first network, for example, a second slice of the first network and/or a second AMF of the first network. The second slice of the first network may be a slice, in the first network, used for the second network and/or accessing a second network service. The second AMF of the first network may be an AMF, in the first network, used for the second network and/or accessing a second network service. The second slice of the first network may include at least one of the following: the first-network second AMF, a first-network second UPF, a first-network second SMF, a first-network second UDM, and a first-network second PCF. In this case, a part, of the first network, other than the second network may include at least one of the following: a first-network first AMF, a first-network first UPF, a first-network first SMF, a first-network first UDM, and a first-network first PCF. The schematic structural diagram of the network system may be shown in FIG. 2C, and the terminal may interact with the first network (for example, the first-network first AMF or the first-network first UPF) and a second network element (for example, the first-network second AMF or the first-network second UPF) through the first-network RAN network element. The following describes the method for controlling network access according to some embodiments of this disclosure.

Figure 3:
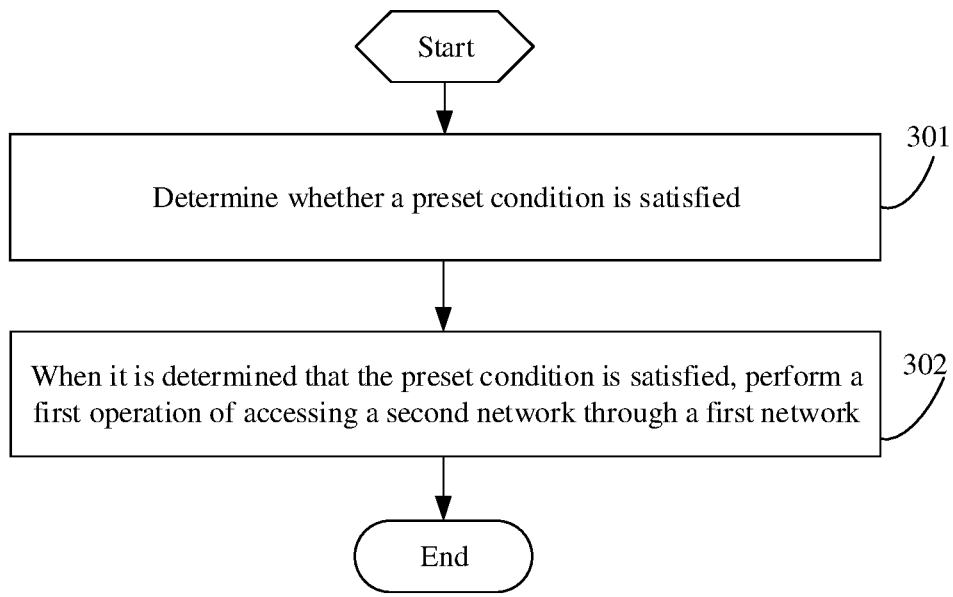
FIG. 3 is a flowchart of a method for controlling network access according to some embodiments of this disclosure.

FIG. 3 is a flowchart of a method for controlling network access according to some embodiments of this disclosure. The method is applied to a first communications device (for example, a terminal or a communications network element). As shown in FIG. 3, the following steps are included.

Step 301: Determine whether a preset condition is satisfied.

Step 302: When it is determined that the preset condition is satisfied, perform a first operation of accessing a second network through a first network.

Optionally, the performing a first operation of accessing a second network through a first network includes at least one of the following:
 transmitting first information;
 transmitting request information for establishing a second SRB;
 transmitting request information for establishing a second DRB;
 transmitting second NAS information through the second SRB or the second DRB; and
 transmitting related information between a terminal and the second network through the second SRB or the second DRB.

Further, the first information, the request information for establishing a second SRB, and/or the request information for establishing a second DRB are/is transmitted to at least one of the following: a third communications device, a network element of the first network (for example, a first-network RAN network element).

Further, the network element of the first network may optionally be a RAN network element of the first network.

Optionally, the first information includes at least one of the following: information about the second network, first indication information, NAS information, and second NAS information.

Further, the NAS information includes at least one of the following: first NAS information and the second NAS information. In an implementation, the first NAS information and the second NAS information are transmitted in a same NAS information element. When the NAS information is transmitted, to distinguish the first NAS information from the second NAS information, the first indication information and/or the information about the second network may be transmitted. In another implementation, the second NAS information is transmitted through a second NAS information element, and it can be determined, based on the second NAS information element, that the second NAS information is transmitted. Further, the information about the second network includes at least one of the following: an identifier of the second network and instruction information for accessing the second network.

Further, the first indication information may include at least one of the following: second routing indication information, non-second routing indication information, first routing indication information, and non-first routing indication information. In this way, it may be determined, through the routing-related indication information, how to route the NAS information of the two networks.

The first routing indication information and the non-second routing indication information may be related to the first network. The first routing indication information or the non-second routing indication information may include at least one of the following: indication information of the first network, indication information of the first NAS information, indication information of a first SRB, indication information of a first DRB, indication information of a first NG connection, indication information of a first AMF, and indication information of a first UPF.

The second routing indication information and the non-first routing indication information may be related to the second network. The second routing indication information or the non-first routing indication information may include at least one of the following: indication information of the second network, second routing indication information, indication information of the second NAS information, indication information of a second SRB, indication information of a second DRB, indication information of a second NG connection, indication information of a second AMF, indication information of a second UPF, and indication information of a proxy network element.

In an implementation, both the first NAS information and the second NAS information are transmitted to a NAS message in the first SRB of the first network. It is not difficult to understand that the first indication information may be indicated to distinguish the first NAS information from the second NAS information. It is not difficult to understand that the information about the second network may alternatively be indicated to distinguish the first NAS information from the second NAS information.

Optionally, the preset condition is at least one of the following:
  there is a requirement for interaction between the terminal and the second network;
  there is a requirement for transmitting the related information between the terminal and the second network;
  there is a requirement for transmitting the second NAS information;
  there is a requirement for accessing the second network;
  there is first network coverage but no second network coverage; and
  a current location is covered by the first network but not covered by the second network.

That there is a requirement for interaction between the terminal and the second network includes at least one of the following: there is a requirement for transmitting the second NAS information, there is a requirement for transmitting the related information between the terminal and the second network, and there is a requirement for transmitting user plane data between the terminal and the second network.

In an implementation, "not covered by the second network" means that no signal of the second network is detected, a detected signal of the second network does not satisfy an access condition, and/or the first network does not support the second network.

In another implementation, "covered by the first network" means that a signal of the first network can be detected or a detected signal of the first network can satisfy an access condition.

In an implementation, the second NAS information is transmitted through the second SRB. When no second SRB has been established, the request information for establishing a second SRB is transmitted to the first-network RAN network element. After the second SRB is established, the second NAS information is transmitted through the second SRB.

In an implementation, the first information is transmitted through the second DRB. When no second DRB has been established, the request information for establishing a second DRB is transmitted to the first-network RAN network element. After the second DRB is established, the second NAS information is transmitted through the second DRB. The second DRB may be a default DRB.

In an implementation, the second SRB is an SRB different from the first SRB. In another implementation, the second SRB is the same as the first SRB.

In an implementation, the second DRB is a DRB different from the first DRB. In another implementation, the second DRB is the same as the first DRB.

Optionally, definitions of the NAS information, the first NAS information, the second NAS information, the first SRB, the first DRB, the second SRB, and the second DRB have been described in the previous part of Description of Embodiments. Details are not repeated herein.

Optionally, content contained in the related information between the terminal and the second network has been described in the previous part of Description of Embodiments. Details are not repeated herein.

In an implementation, the terminal is registered with both the first network and the second network, and can store both a registration context of the first network and a registration context of the second network.

In an implementation, the second SRB, the second DRB, and the second NAS information may be related to the second network.

In an implementation, the second network may be a network different from the first network or a part of the first network. When the second network is a part of the first network, the second network is at least one of the following: a second AMF of the first network, a part of the first network, and a slice of the first network.

In some embodiments of this disclosure, the first network can be distinguished from the second network, the second network or a proxy network element can be selected for the terminal, resources can be configured for the terminal to access the first network and the second network, and information between the terminal and the first network and related information between the terminal and the second network can be routed in the first network, so that the terminal can access the second network and a second network service through the first network.

Figure 4:
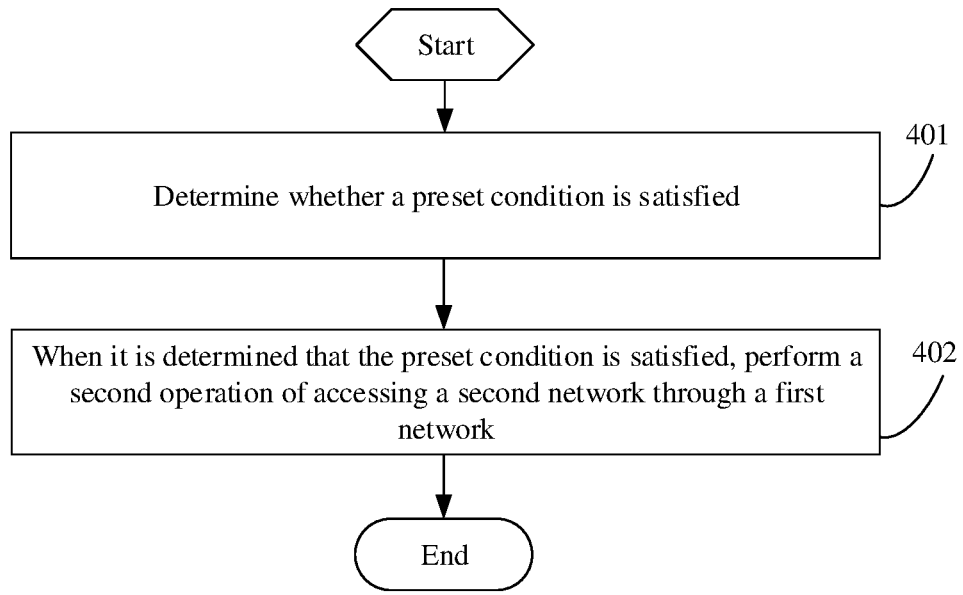
FIG. 4 is another flowchart of a method for controlling network access according to some embodiments of this disclosure.

FIG. 4 is a flowchart of a method for controlling network access according to some embodiments of this disclosure. The method is applied to a second communications device, for example, a second communications network element. The second communications network element may include at least one of the following: a network element of the second network, a proxy network element, a network element in a second slice of the first network (for example, a first-network slice that is used for the second network and/or accessing a second network service), and a second AMF of the first network (for example, a first-network AMF that is used for the second network and/or accessing a second network service). The second network may be a part of the first network, for example, a network element in a slice of the second network and/or an AMF of the second network. The second network may be used only for access by terminals of the second network. As shown in FIG. 4, the method includes the following steps.

Step 401: Determine whether a preset condition is satisfied.

Step 402: When it is determined that the preset condition is satisfied, perform a second operation of accessing a second network through a first network.

Optionally, the performing a second operation of accessing a second network through a first network may include at least one of the following:

transmitting first information;

transmitting a paging message, where the paging message includes the first information;

transmitting the first information through a second NG connection or a third NG connection;

transmitting second NAS information and/or related information between a terminal and the second network through a second NG connection; and transmitting second NAS information and/or related information between the terminal and the second network through a third NG connection.

Further, the first information is transmitted to at least one of the following: a network element of the first network and a proxy network element.

The network element of the first network may optionally be a first-network RAN network element. The proxy network element is a proxy between the first network and the second network, including N3IWF.

Optionally, the first information includes at least one of the following: information about the second network, first indication information, NAS information, and second NAS information, Further, the NAS information includes at least one of the following: first NAS information and the second NAS information. In an implementation, the first NAS information and the second NAS information are transmitted in a same NAS information element. When the NAS information is transmitted, to distinguish the first NAS information from the second NAS information, the first indication information and/or the information about the second network may be transmitted. In another implementation, the second NAS information is transmitted through a second NAS information element, and it can be determined, based on the second NAS information element, that the second NAS information is transmitted.

In an implementation, the paging message may be a notification message.

In an implementation, the paging message includes the first information.

Further, the first paging message and the second paging message are transmitted in a same paging message. When the paging message is received, the first paging message and the second paging message cannot be distinguished. In this case, the first information (for example, the first indication information and/or the information about the second network) contained in the paging message may be used to distinguish between the first paging message and the second paging message. In another implementation, the second paging message is transmitted through a second paging message element, and it can be determined, based on the second paging message element, that the second paging message is received.

Further, the information about the second network includes at least one of the following: an identifier of the second network and instruction information for accessing the second network.

Further, the first indication information is the same as the first indication information described in the embodiment of FIG. 3. Details are not repeated herein.

Optionally, the preset condition is at least one of the following:

there is a requirement for interaction between the terminal and the second network;

there is a requirement for transmitting the related information between the terminal and the second network;

there is a requirement for transmitting the second NAS information; and the terminal accesses the second network through the first network or a proxy network element.

In an implementation, that the terminal accesses the second network through the first network or the proxy network element includes: the terminal initiates a location update, mobile registration update, or registration request to the second network through the first network or the proxy network element. An identifier (for example, TAC or TAI) of a location area of the terminal is a unique identifier (for example, TAC or TAI) of the proxy network element (for example, N3IWF).

In an implementation, the second NAS information is transmitted through the second NG connection or the third NG connection, or the related information between the terminal and the second network is transmitted through the second NG connection or the third NG connection. When no second NG connection or third NG connection has been established, the paging message is transmitted to the first-network RAN network element or the proxy network element. The paging message may include the first information.

Optionally, definitions of the NAS information, the second NAS information, the second NG connection, and the third NG connection have been described in the previous part of Description of Embodiments. Details are not repeated herein.

Optionally, content contained in the related information between the terminal and the second network has been described in the previous part of Description of Embodiments. Details are not repeated herein.

In some embodiments of this disclosure, the first network can be distinguished from the second network, the second network or a proxy network element can be selected for the terminal, resources can be configured for the terminal to access the first network and the second network, and information between the terminal and the first network and related information between the terminal and the second network can be routed in the first network, so that the terminal can access the second network and a second network service through the first network.

Figure 5:
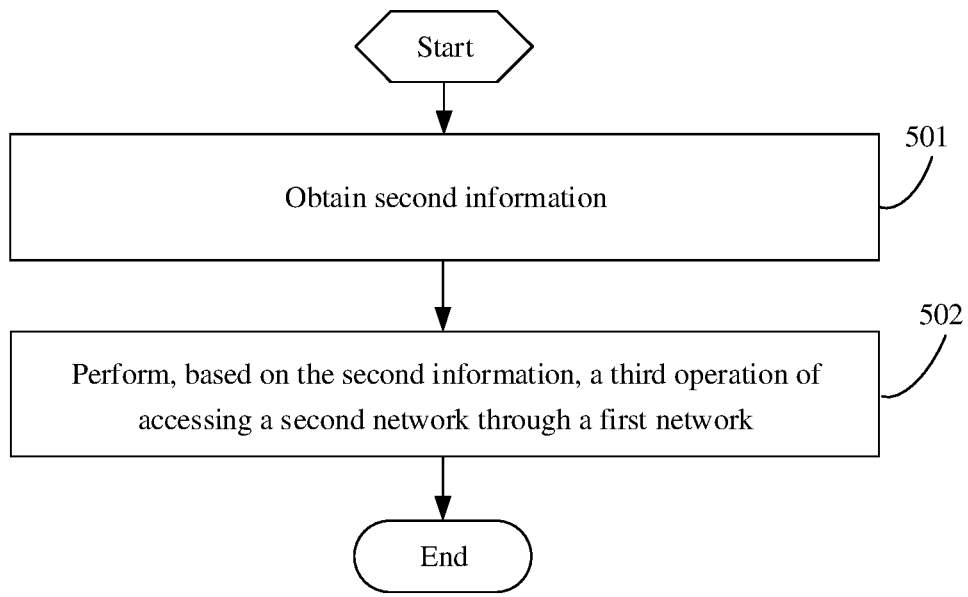
FIG. 5 is another flowchart of a method for controlling network access according to some embodiments of this disclosure.

FIG. 5 is a flowchart of a method for controlling network access according to some embodiments of this disclosure. The method is applied to a third communications device, for example, a first communications network element. The first communications network element is a network element of the first network, and may include a CN network element or a RAN network element. The CN network element is, for example, an AMF, an SMF, or a UPF. As shown in FIG. 5, the method includes the following steps.

Step 501: Obtain second information.

The second information includes at least one of the following: information about a second network, first indication information, NAS information, second NAS information, a paging message, a second paging message, request information for establishing a second SRB, request information for establishing a second DRB, data in the second SRB, data in the second DRB, and data in a second NG connection.

Further, the NAS information includes at least one of the following: first NAS information and the second NAS information; and/or the paging message includes at least one of the following: first information (the first information has been described above, and details are not repeated herein), a first paging message, and the second paging message; and/or the information about the second network includes at least one of the following: an identifier of the second network and instruction information for accessing the second network.

Further, the information about the second network includes at least one of the following: an identifier of the second network and instruction information for accessing the second network.

Further, the first indication information is the same as the first indication information described in the embodiment of FIG. 3. Details are not repeated herein.

In an implementation, the second NAS information is received through the second SRB or the second DRB. In another implementation, the second NAS information is received through a second NG connection.

In an implementation, the related information between the terminal and the second network is received through the second SRB or the second DRB. In another implementation, the second NAS information or the related information between the terminal and the second network is received through the second NG connection.

Step 502: Perform, based on the second information, a third operation of accessing a second network through a first network.

The performing a third operation of accessing a second network through a first network includes at least one of the following:

determining a target end of NAS information transmission;

determining that the NAS information is the second NAS information;

transmitting the second NAS information to a proxy network element or a network element of the second network;

transmitting the second NAS information and the first information to the terminal;

transmitting the NAS information and the first information to the terminal;

determining that the paging message is the second paging message;

transmitting the second paging message to the terminal, where the second paging message includes the first information;

transmitting the paging message to the terminal, where the paging message includes the first information;

selecting a proxy network element of the second network or a network element of the second network for the terminal;

requesting the selected network element or proxy network element of the second network to establish the second NG connection;

establishing the second SRB for the terminal or transmitting configuration information of the second SRB to the terminal;

transmitting configuration information of the second SRB and the first information to the terminal;

establishing the second DRB for the terminal or transmitting configuration information of the second DRB to the terminal;

transmitting the configuration information of the second DRB and the first information to the terminal;

transmitting the data in the second SRB or the data in the second DRB to the second NG connection;

transmitting the data in the second NG connection to the second SRB or the second DRB;

determining that the NAS information is the first NAS information;

transmitting the second NAS information to a network element of the first network;

determining that the paging message is the first paging message; and transmitting the first paging message to the terminal, where the first paging message includes the first information.

In an implementation, the determined target end of the NAS information transmission includes at least one of the following: a network element of the first network, a network element of the second network, and a proxy network element.

In an implementation, when a first condition is satisfied, the NAS information is transmitted to the network element of the first network. The first condition includes at least one of the following: the first indication information indicates the first routing indication information or the non-second routing indication information, the second information does not include the first indication information, and the NAS information is received from the first SRB.

In an implementation, when a second condition is satisfied, the NAS information is transmitted to the network element of the second network or the proxy network element. The second condition includes at least one of the following: the first indication information indicates the second routing indication information or the non-first routing indication information, the second information includes the information about the second network, the NAS information is received from the second SRB or the second DRB, and the second NAS information is obtained.

In an implementation, the determining that the NAS information is the second NAS information includes at least one of the following: determining, based on the information about the second network, that the NAS information is the second NAS information; determining, based on the first indication information indicating the second routing indication information or the non-first routing indication information, that the NAS information is the second NAS information; determining, based on the NAS information being received from the second SRB or the second DRB, that the NAS information is the second NAS information; and determining, based on the second NAS information, that the NAS information is the second NAS information. In an implementation, different information elements are used for the first NAS information and the second NAS information, so that the first NAS information and the second NAS information can be directly distinguished. In another implementation, a same NAS information-related information element is used for both the first NAS information and the second NAS information. In this case, additional information (for example, the first information, where the first information has been described above, and details are not repeated herein) is used to determine whether obtained NAS information is the first NAS information or the second NAS information.

In an implementation, the determining that the paging message is the second paging message includes at least one of the following: determining, based on the information about the second network, that the paging message is the second paging message; determining, based on the first indication information indicating the second routing indication information or the non-first routing indication information, that the paging message is the second paging message; determining, based on the paging message being received from a proxy network element or the second network, that the paging message is the second paging message; and determining, based on the second paging message, that the paging message is the second paging message. In an implementation, different information elements or paging messages are used for the first paging message and the second paging message, so that the first paging message and the second paging message can be directly distinguished. In another implementation, a same paging message is used for both the first paging message and the second paging message. In this case, additional information (for example, the first information, where the first information has been described above, and details are not repeated herein) is used to determine whether an obtained paging message is the first paging message or the second paging message.

The first routing indication information, the non-first routing indication information, the second routing indication information, and the non-second routing indication information have been described in the embodiment of FIG. 3. Details are not repeated herein.

In an implementation, the paging message may be a notification message.

In an implementation, the paging message includes the first information.

In an implementation, the proxy network element of the second network or the network element of the second network is selected for the terminal based on the information about the second network. In an implementation, the requesting the selected network element or proxy network element of the second network to establish the second NG connection includes transmitting an initial UE message to the selected network element or proxy network element of the second network.

In an implementation, the data in the second SRB, the data in the second DRB, and/or the data in the second NG connection includes at least one of the following: the information about the second network, the first indication information, the second NAS information, and the second paging message.

In an implementation, the second information is obtained from at least one of the following: a first communications device (for example, a terminal), a second communications device (for example, a second communications network element), and the network element and the proxy network element of the second network. The proxy network element is a proxy between the first network and the second network, for example, N3IWF.

In an implementation, when the second information is obtained from the terminal, the second information is transmitted to the proxy network element and/or the network element of the second network. When the second information is obtained from the proxy network element or the network element of the second network, the second information is transmitted to the terminal.

Optionally, definitions of the NAS information, the first NAS information, the second NAS information, the first SRB, the second SRB, the first DRB, the second DRB, the first NG connection, the second NG connection, and the third NG connection have been described in the previous part of Description of Embodiments. Details are not repeated herein.

Optionally, content contained in the related information between the terminal and the second network has been described in the previous part of Description of Embodiments. Details are not repeated herein.

In addition, it should be noted that this embodiment is an implementation of the first communications network element corresponding to the embodiments of FIG. 3 and FIG. 4. For a specific implementation of this embodiment, reference may be made to the embodiments of FIG. 3 and FIG. 4.

In some embodiments of this disclosure, the first network can be distinguished from the second network, the second network or a proxy network element can be selected for the terminal, resources can be configured for the terminal to access the first network and the second network, and information between the terminal and the first network and related information between the terminal and the second network can be routed in the first network, so that the terminal can access the second network and a second network service through the first network.

Figure 6:
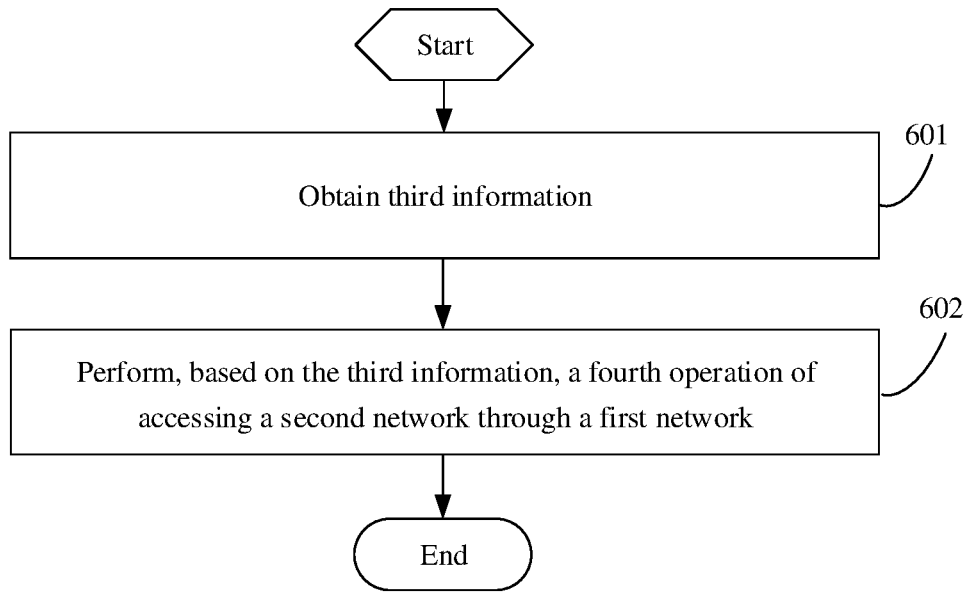
FIG. 6 is another flowchart of a method for controlling network access according to some embodiments of this disclosure.

FIG. 6 is a flowchart of another method for controlling network access according to some embodiments of this disclosure. The method is applied to a fourth communications device (for example, a terminal). As shown in FIG. 6, the following steps are included.

Step 601: Obtain third information.

The third information includes at least one of the following: information about a second network, first indication information, NAS information, a paging message, a second paging message, configuration information of an SRB, configuration information of a second SRB, configuration information of a DRB, configuration information of a second DRB, data in the second SRB, and data in the second DRB. The second SRB and the second DRB are related to the second network.

Further, the NAS information includes at least one of the following: first NAS information and the second NAS information; and/or the configuration information of the SRB includes at least one of the following: configuration information of a first SRB and the configuration information of the second SRB; and/or the configuration information of the DRB includes at least one of the following: configuration information of a first DRB and the configuration information of the second DRB; and/or the information about the second network includes at least one of the following: an identifier of the second network and instruction information for accessing the second network.

Further, the first indication information is the same as the first indication information described in the embodiment of FIG. 3. Details are not repeated herein.

In an implementation, the second NAS information is received through the second SRB or the second DRB.

In an implementation, the related information between the terminal and the second network is received through the second SRB or the second DRB.

Step 602: Perform, based on the third information, a fourth operation of accessing a second network through a first network.

Optionally, the performing a fourth operation of accessing a second network through a first network includes at least one of the following:

determining that the NAS information is the second NAS information;

determining that the SRB is the second SRB;

transmitting and/or receiving related information between a terminal and the second network through the second SRB;

transmitting and/or receiving the second NAS information through the second SRB;

determining that the DRB is the second DRB;

transmitting and/or receiving the related information between the terminal and the second network through the second DRB;

transmitting and/or receiving the second NAS information through the second DRB;

determining that the NAS information is the first NAS information;

determining that the SRB is the first SRB;

transmitting and/or receiving related information between the terminal and the first network through the first SRB; and transmitting and/or receiving the first NAS information through the first SRB.

In an implementation, the determining that the NAS information is the second NAS information includes at least one of the following: determining, based on the information about the second network, that the NAS information is the second NAS information; determining, based on the first indication information indicating the second routing indication information or the non-first routing indication information, that the NAS information is the second NAS information; determining, based on the NAS information being received from the second SRB or the second DRB, that the NAS information is the second NAS information; and determining, based on the second NAS information, that the NAS information is the second NAS information. In an implementation, different information elements are used for the first NAS information and the second NAS information, so that the first NAS information and the second NAS information can be directly distinguished. In another implementation, a same NAS information-related information element is used for both the first NAS information and the second NAS information. In this case, additional information (for example, the first information, where the first information has been described above, and details are not repeated herein) is used to determine whether the obtained NAS information is the first NAS information or the second NAS information.

In an implementation, the determining that the SRB is the second SRB includes at least one of the following: determining, based on the information about the second network, that the SRB is the second SRB; determining, based on the first indication information indicating the second routing indication information or the non-first routing indication information, that the SRB is the second SRB; and determining, based on the configuration information of the second SRB, that the SRB is the second SRB. In an implementation, different information elements are used for the configuration information of the first SRB and the configuration information of the second SRB, so that the first SRB and the second SRB can be directly distinguished. In another implementation, different SRB numbers are used for the first SRB and the second SRB. For example, the $N^{th}$ SRB (for example, SRB4) is used to indicate the second SRB. In another implementation, same configuration information of an SRB-related information element is used for both the configuration information of the first SRB and the configuration information of the second SRB. In this case, additional information (for example, the first information, where the first information has been described above, and details are not repeated herein) is used to determine whether obtained configuration information of an SRB corresponds to the first SRB or the second SRB.

In an implementation, the determining that the DRB is the second DRB includes at least one of the following: determining, based on the information about the second network, that the DRB is the second DRB; determining, based on the first indication information indicating the second routing indication information or the non-first routing indication information, that the DRB is the second DRB; and determining, based on the configuration information of the second DRB, that the DRB is the second DRB. In an implementation, different information elements are used for the configuration information of the first DRB and the configuration information of the second DRB, so that the first DRB and the second DRB can be directly distinguished. In another implementation, same configuration information of a DRB-related information element is used for both the configuration information of the first DRB and the configuration information of the second DRB. In this case, additional information (for example, the first information, where the first information has been described above, and details are not repeated herein) is used to determine whether obtained configuration information of a DRB corresponds to the first DRB or the second DRB.

In an implementation, the determining that the paging message is the second paging message includes at least one of the following: determining, based on the information about the first network, that the paging message is the second paging message; determining, based on the first indication information indicating the second routing indication information or the non-first routing indication information, that the paging message is the second paging message; determining, based on the paging message being received from a proxy network element or the second network, that the paging message is the second paging message; and determining, based on the second paging message, that the paging message is the second paging message. In an implementation, different information elements or paging messages are used for the first paging message and the second paging message, so that the first paging message and the second paging message can be directly distinguished. In another implementation, a same paging message is used for both the first paging message and the second paging message. In this case, additional information (for example, the first information, where the first information has been described above, and details are not repeated herein) is used to determine whether an obtained paging message is the first paging message or the second paging message.

The first routing indication information, the non-first routing indication information, the second routing indication information, and the non-second routing indication information have been described in the embodiment of FIG. 3. Details are not repeated herein.

In an implementation, the paging message may be a notification message.

In an implementation, the paging message includes the first information.

In an implementation, the data in the second SRB, the data in the second DRB, and/or the data in the second NG connection includes at least one of the following: the information about the second network, the first indication information, the second NAS information, and the second paging message.

In an implementation, the third information is obtained from a network element of the first network. The network element of the first network may optionally be a first-network RAN network element.

In an implementation, the first NAS information and the second NAS information are transmitted in a same NAS information element. When the NAS information is received, the first NAS information and the second NAS information cannot be distinguished. In this case, the first indication information and/or the information about the second network may be used to distinguish the first NAS information from the second NAS information. In another implementation, the second NAS information is transmitted through a second NAS information element, and it can be determined, based on the second NAS information element, that the second NAS information is received.

In an implementation, the first paging message and the second paging message are transmitted in a same paging message. When the paging message is received, the first paging message and the second paging message cannot be distinguished. In this case, the first indication information and/or the information about the second network contained in the paging message may be used to distinguish the first paging message from the second paging message. In another implementation, the second paging message is transmitted through a second paging message, and it can be determined, based on the second paging message, that the second paging message is received.

In an implementation, the configuration information of the first SRB and the configuration information of the second SRB are transmitted in same configuration information of an SRB element. When the configuration information of the SRB is received, the configuration information of the first SRB and the configuration information of the second SRB cannot be distinguished. In this case, the first indication information and/or the information about the second network may be used to distinguish the configuration information of a first SRB from the configuration information of the second SRB. In another implementation, the configuration information of the second SRB is transmitted through the configuration information of the second SRB element, and it can be determined, based on the configuration information of the second SRB element, that the configuration information of the second SRB is received.

In an implementation, the configuration information of a first DRB and the configuration information of the second DRB are transmitted in same configuration information of a DRB element. When the configuration information of the DRB is received, the configuration information of a first DRB and the configuration information of the second DRB cannot be distinguished. In this case, the first indication information and/or the information about the second network may be used to distinguish the configuration information of a first DRB from the configuration information of the second DRB. In another implementation, the configuration information of the second DRB is transmitted through the configuration information of the second DRB element, and it can be determined, based on the configuration information of the second SRB element, that the configuration information of the second DRB is received.

Optionally, definitions of the NAS information, the first NAS information, the second NAS information, the first SRB, the second SRB, the first DRB, and the second DRB have been described in the previous part of Description of Embodiments. Details are not repeated herein.

Optionally, content contained in the related information between the terminal and the second network has been described in the previous part of Description of Embodiments. Details are not repeated herein.

In an implementation, the first routing indication information and the non-second routing indication information are related to the first network.

In an implementation, the second SRB, the second DRB, the second paging message, the second NAS information, the second routing indication information, and the non-first routing indication information are related to the second network.

In an implementation, the second NG connection is a control plane connection, for a terminal, between a first-network element and a second-network element or a proxy network element.

In some embodiments of this disclosure, the first network can be distinguished from the second network, the second network or a proxy network element can be selected for the terminal, resources can be configured for the terminal to access the first network and the second network, and information between the terminal and the first network and related information between the terminal and the second network can be routed in the first network, so that the terminal can access the second network and a second network service through the first network.

Figure 7:
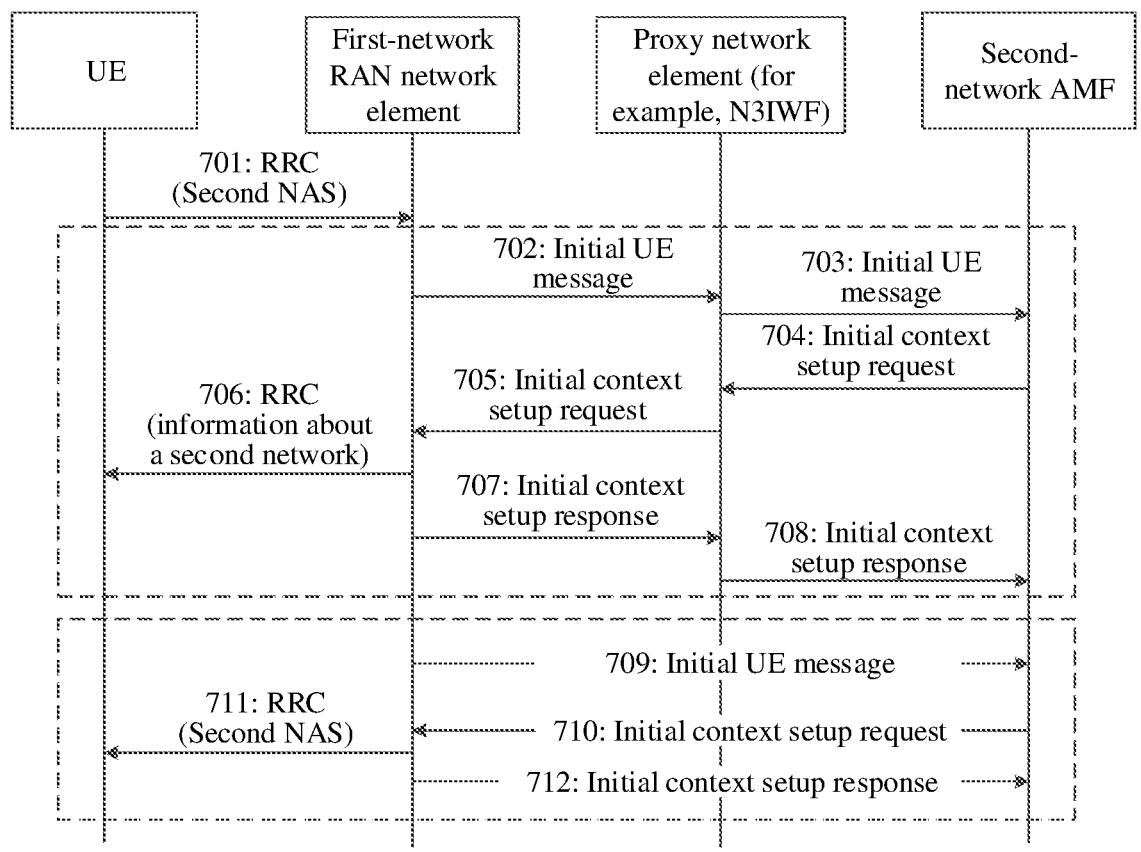
FIG. 7 is a flowchart of a method for controlling network access according to some embodiments of this disclosure.
Figure 8:
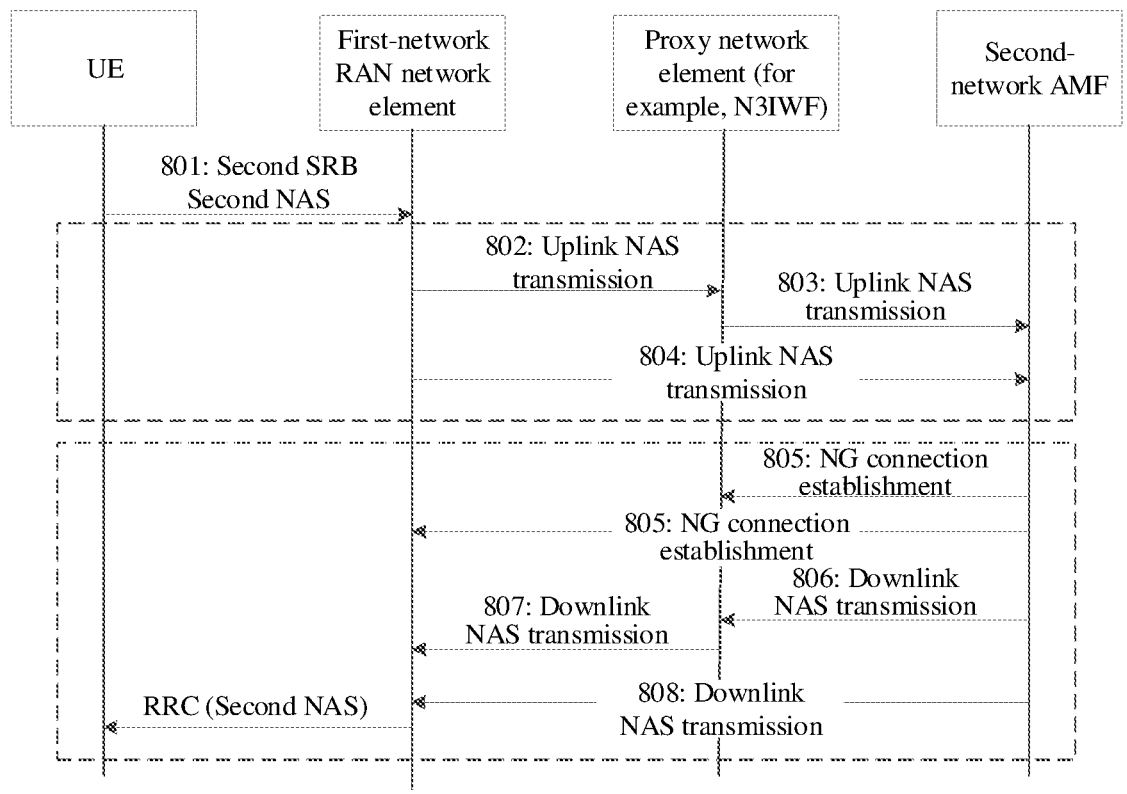
FIG. 8 is a flowchart of a method for controlling network access according to some embodiments of this disclosure.
Figure 9:
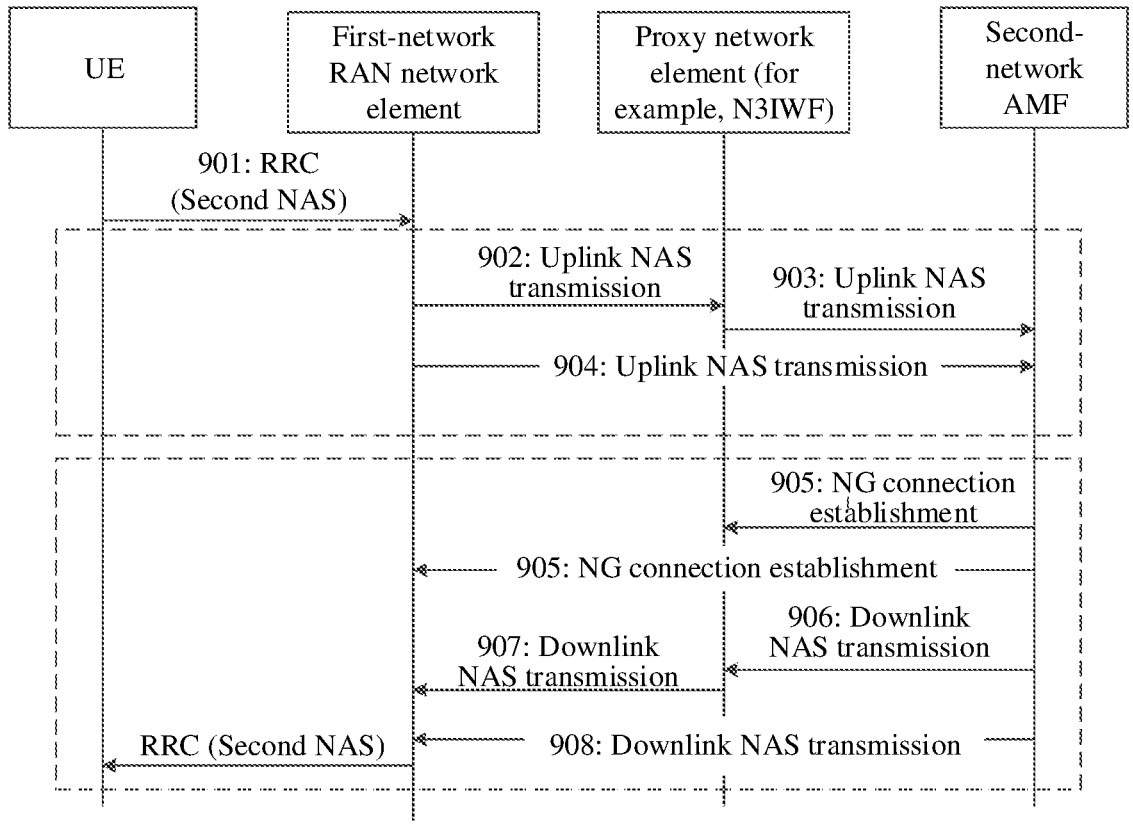
FIG. 9 is a flowchart of a method for controlling network access according to some embodiments of this disclosure.

The following describes in detail specific embodiments of this disclosure with reference to FIG. 7 to FIG. 9.

The embodiment of FIG. 7 mainly describes a process in which a terminal (UE) and a second network transmit information (for example, second NAS information) between the UE and the second network through a first network. Referring to FIG. 7, the transmission process involved includes the following steps.

Step 701: The UE and the first network establish an RRC connection or are in RRC connected mode.

The UE establishes a first NG connection through a first-network RAN network element. The first NG connection is an NG connection, for the UE, between the first-network RAN network element and a first-network AMF.

When the UE needs to transmit second NAS information, the UE transmits an RRC message to the first-network RAN network element. When the RRC connection between the UE and the first-network RAN network element is in idle mode, the UE may first request the first-network RAN network element to establish an RRC connection. When the RRC connection between the UE and the first-network RAN network element is in inactive mode, the UE may first request the first-network RAN network element to restore the RRC connection.

The RRC message contains a NAS message and information about the second network.

The NAS message may be a Dedicated NAS-Message.

The dedicated NAS message can be used to transmit UE specific NAS layer information between a 5GC CN network element and UE. The RRC layer is transparent for the dedicated NAS message. (The IE Dedicated NAS-Message is used to transfer UE specific NAS layer information between the 5GC CN and the UE. The RRC layer is transparent for this information).

Based on the information about the second network, the first-network RAN network element can identify the NAS information in the NAS message as the second NAS information.

If no N2 connection, for the terminal, between the terminal and the second network has been established, the first-network RAN network element may select a network element (for example, an AMF) of the second network or a proxy network element (for example, N3IWF) for the terminal. When the first-network RAN network element selects a network element of the second network, steps 709 to 712 are performed; and when the first-network RAN network element selects a proxy network element, steps 702 to 708 are performed.

Step 702: The first-network RAN network element transmits an NG interface message (for example, an initial UE message) to the proxy network element, where the NG interface message includes the NAS information (for example, a NAS-PDU) received from the terminal and/or a RAN-side UE identifier of a second NG interface.

The RAN-side UE identifier of the NG interface is, for example, an RAN UE NGAP ID.

The NAS information in the NG interface message may be a NAS-PDU. The NAS-PDU may be included in a 5GC-to-UE or UE-to-5GC message, and the NAS-PDU is transmitted to an RAN network element without interpretation by the RAN network element. (This IE contains a 5GC—UE or UE-5GC message that is transferred without interpretation in the NG-RAN node).

In an implementation, the RAN-side UE identifier of the second NG interface is consistent with a RAN-side UE identifier of the first NG interface.

Step 703: The proxy network element transmits the initial UE message to the second-network AMF, where the initial UE message includes the NAS information.

Step 704: The second-network AMF transmits an NG interface message, such as an initial context establishment request message, to the proxy network element, where the NG interface message may include NAS information and/or information about the second network.

Step 705: The proxy network element transmits an NG interface message, for example, an initial context setup request message, to the first-network RAN network element, where the NG interface message may include the NAS information and/or the information about the second network.

Step 706: The first-network RAN network element transmits the NAS information and/or the information about the second network to the UE.

In an implementation, the terminal identifies the NAS information as the second NAS information based on the information about the second network.

In an implementation, after establishing a second SRB for the terminal, the first-network RAN network element transmits the NAS information, so that the terminal identifies the NAS information as the second NAS information based on the second SRB.

Step 707 to step 708: The first-network RAN network element transmits an initial context setup response message to the second-network AMF through the proxy network element.

Step 709: The first-network RAN network element transmits an initial UE message to the second-network AMF, where the initial UE message contains the NAS information (for example, the NAS-PDU).

Step 710: The second-network AMF transmits an NG interface message, for example, an initial context setup request message, to the first-network RAN network element, where the NG interface message may include the NAS information and/or the information about the second network.

Step 711 is the same as step 706. Details are not described herein again.

Step 712: The first-network RAN network element transmits an initial context setup response message to the second-network AMF.

It can be understood that the first NAS information is NAS information related to the terminal and the second network. The second NAS information is NAS information related to the terminal and the second network.

The embodiment of FIG. 8 mainly describes a process in which a terminal UE and a second network transmit second NAS information through a first network. Uplink transmission is described in step 801 to step 804; and downlink transmission is described in step 805 to step 808. Referring to FIG. 8, the transmission process involved includes the following steps.

Step 801: The UE and the first network establish a second SRB.

When the UE needs to transmit second NAS information, the UE transmits the second NAS information to the second SRB of a first-network RAN network element. In an implementation, the second NAS information may be transmitted in a NAS message in the second SRB.

The NAS message may be a DedicatedNAS-Message (dedicated NAS message).

The dedicated NAS message can be used to transmit UE specific NAS layer information between a 5GC CN network element and UE. The RRC layer is transparent for the dedicated NAS message.

Based on the second SRB, the first-network RAN network element can identify NAS information in the NAS message as the second NAS information.

If an NG connection, for the terminal, between the UE and the second network has been established, the first-network RAN network element may transmit the NAS information to a second-network AMF through a proxy network element, as described in step 802 and step 803; or directly transmit the NAS information to a second-network AMF, as described in step 804.

Step 805: The second-network AMF and the proxy network element or the first-network RAN network element establish an NG connection for the UE.

When the second-network AMF needs to transmit the second NAS information, the second-network AMF transmits an NG interface message to the first-network RAN network element through the proxy network element, as described in step 806 and step 807; or the second-network AMF directly transmits an NG interface message to the first-network RAN network element, as described in step 808.

The NG message includes the NAS information.

Based on a second NG interface, the first-network RAN network element may identify the NAS information as the second NAS information.

If the second SRB between the terminal and the first-network RAN network element has been established, the first-network RAN network element may transmit the second NAS information to the terminal. If the second SRB between the terminal and the first network has not been established, the first-network RAN network element may configure the second SRB for the terminal. After the second SRB between the first-network RAN network element and the terminal is established, the first-network RAN network element may transmit the NAS information to the terminal through the second SRB.

Based on the second SRB, the terminal can identify the NAS information as the second NAS information. An AS layer of the terminal may transmit the second NAS information to a second NAS layer.

Alternatively, the AS layer of the terminal may transmit the second NAS information to a first NAS layer. The first NAS layer transmits the second NAS information to a second NAS layer after identification.

The embodiment of FIG. 9 mainly describes a process in which a terminal UE and a second network transmit second NAS information through a first network. Uplink transmission is described in step 901 to step 904; and downlink transmission is described in step 905 to step 908. Referring to FIG. 9, the transmission process involved includes the following steps.

Step 901: The UE and the first network establish an RRC connection or are in RRC connected mode.

The UE establishes a first NG connection through a first-network RAN network element. The first NG connection is an NG connection, for the UE, between the first-network RAN network element and a first-network AMF.

When the UE needs to transmit second NAS information, the UE transmits an RRC message to the first-network RAN network element.

The RRC message contains a NAS message and information about the second network.

The NAS message may be a DedicatedNAS-Message (dedicated NAS message).

The dedicated NAS message can be used to transmit UE specific NAS layer information between a 5GC CN network element and UE. The RRC layer is transparent for the dedicated NAS message.

Based on the information about the second network, the first-network RAN network element can identify the NAS information in the NAS message as the second NAS information.

If an NG connection, for the terminal, between the UE and the second network has been established, the first-network RAN network element may transmit the NAS information to a second-network AMF through a proxy network element, as described in step 902 and step 903; or directly transmit the NAS information to a second-network AMF, as described in step 904.

Step 905: The second-network AMF and the proxy network element or the first-network RAN network element establish an NG connection for the UE.

When the second-network AMF needs to transmit the second NAS information, the second-network AMF transmits an NG interface message to the first-network RAN network element through the proxy network element, as described in step 906 and step 907; or the second-network AMF directly transmits an NG interface message to the first-network RAN network element, as described in step 908.

The NG message contains the NAS information and/or the information about the second network.

The NAS information contained in the NG message may be a NAS-PDU. The NAS-PDU may be included in a 5GC-to-UE or UE-to-5GC message, and the NAS-PDU is transmitted to an RAN network element without interpretation by the RAN network element.

Based on the information about the second network, the first-network RAN network element can identify the NAS information in the NAS message as the second NAS information.

If the second SRB between the terminal and the first-network RAN network element has been established, the first-network RAN network element may transmit the second NAS information to the terminal. If the second SRB between the terminal and the first network has not been established, the first-network RAN network element may configure the second SRB for the terminal. After the second SRB between the first-network RAN network element and the terminal is established, the first-network RAN network element may transmit the NAS information to the terminal through the second SRB.

Based on the second SRB, the terminal can identify the NAS information as the second NAS information. An AS layer of the terminal may transmit the second NAS information to a second NAS layer.

Alternatively, the AS layer of the terminal may transmit the second NAS information to a first NAS layer. The first NAS layer transmits the second NAS information to a second NAS layer after identification.

The foregoing embodiment describes the method for controlling network access in this disclosure. The following describes a communications device in this disclosure with reference to the embodiments and the accompanying drawings.

Figure 10:
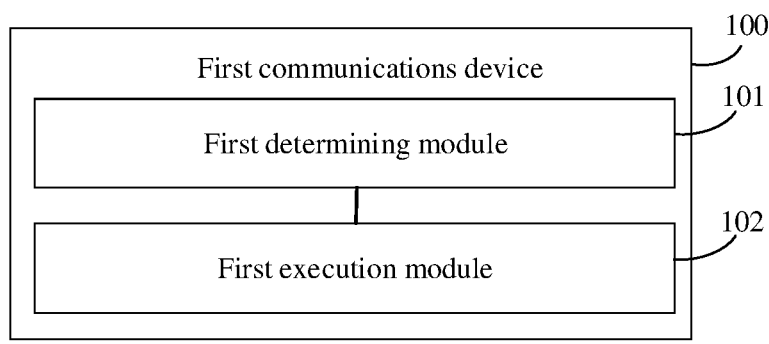
FIG. 10 is a structural diagram of a first communications device according to some embodiments of this disclosure.

FIG. 10 is a structural diagram of a first communications device according to some embodiments of this disclosure. As shown in FIG. 10, the first communications device 100 includes:

a first determining module 101, configured to determine whether a preset condition is satisfied; and a first execution module 102, configured to: when it is determined that the preset condition is satisfied, perform a first operation of accessing a second network through a first network.

Optionally, the first execution module 102 is specifically configured to perform at least one of the following:

transmitting first information;

transmitting request information for establishing a second SRB;

transmitting request information for establishing a second DRB;

transmitting second NAS information through the second SRB or the second DRB; and transmitting related information between a terminal and the second network through the second SRB or the second DRB, where the first information includes at least one of the following: information about the second network, first indication information, NAS information, and second NAS information, where the first indication information includes at least one of the following: first routing indication information, non-second routing indication information, second routing indication information, and non-first routing indication information.

Optionally, the NAS information includes at least one of the following: first NAS information and second NAS information; and/or the information about the second network includes at least one of the following: an identifier of the second network and instruction information for accessing the second network.

Optionally, the preset condition is at least one of the following:
- there is a requirement for interaction between the terminal and the second network;
- there is a requirement for transmitting the related information between the terminal and the second network;
- there is a requirement for transmitting the second NAS information; and
- there is a requirement for accessing the second network;
- there is first network coverage but no second network coverage; and
- a current location is covered by the first network but not covered by the second network.

Optionally, the second SRB, the second DRB, and the second NAS information are related to the second network.

Optionally, the second network is at least one of the following: a second AMF of the first network, a part of the first network, and a slice of the first network.

The first communications device 100 can implement the processes implemented by the terminal in the method embodiment in FIG. 3 of this disclosure, with the same beneficial effects achieved. To avoid repetition, details are not described herein again.

Figure 11:
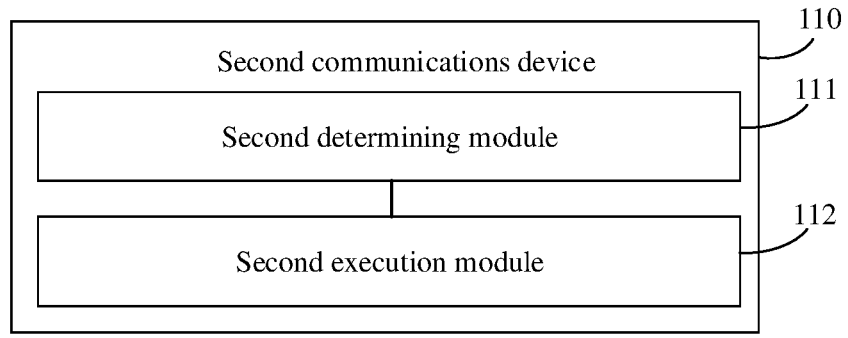
FIG. 11 is a structural diagram of a second communications device according to some embodiments of this disclosure.

FIG. 11 is a structural diagram of a second communications device according to some embodiments of this disclosure. As shown in FIG. 11, the second communications device 110 includes:
- a second determining module 111, configured to determine whether a preset condition is satisfied; and
- a second execution module 112, configured to: when it is determined that the preset condition is satisfied, perform a second operation of accessing a second network through a first network.

Optionally, the second execution module 112 is specifically configured to perform at least one of the following:
- transmitting first information;
- transmitting a paging message, where the paging message includes the first information;
- transmitting the first information through a second NG connection or a third NG connection;
- transmitting second NAS information or related information between a terminal and the second network through a second NG connection; and
- transmitting the second NAS information or the related information between the terminal and the second network through a third NG connection, where the first information includes at least one of the following: information about the second network, first indication information, NAS information, and second NAS information, where the first indication information includes at least one of the following: first routing indication information, non-second routing indication information, second routing indication information, and non-first routing indication information.

Optionally, the NAS information includes at least one of the following: first NAS information and second NAS information; and/or the information about the second network includes at least one of the following: an identifier of the second network and instruction information for accessing the second network.

Optionally, the preset condition is at least one of the following:
- there is a requirement for interaction between the terminal and the second network;
- there is a requirement for transmitting the related information between the terminal and the second network;
- there is a requirement for transmitting the second NAS information; and
- the terminal accesses the second network through the first network or a proxy network element.

Optionally, the second NG connection is a control plane connection, for a terminal, between a first-network element and a second-network element or a proxy network element.

the third NG connection is a control plane connection, for the terminal, between a second-network element or a proxy network element;

the first routing indication information and the non-second routing indication information are related to the first network; and the second routing indication information and the non-first routing indication information are related to the second network.

The second communications device 110 can implement the processes implemented by the second communications network element in the method embodiment in FIG. 4 of this disclosure, with the same beneficial effects achieved. To avoid repetition, details are not described herein again.

Figure 12:
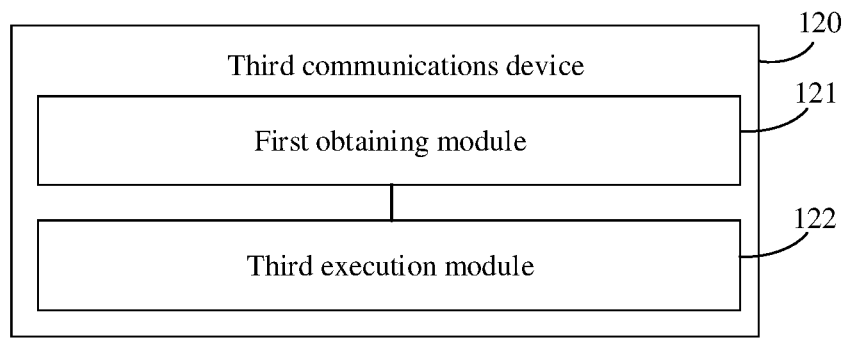
FIG. 12 is a structural diagram of a third communications device according to some embodiments of this disclosure.

FIG. 12 is a structural diagram of a third communications device according to some embodiments of this disclosure. As shown in FIG. 12, the third communications device 120 includes:
- a first obtaining module 121, configured to obtain second information; and
- a third execution module 122, configured to perform, based on the second information, a third operation of accessing a second network through a first network, where the second information includes at least one of the following: information about the second network, first indication information, NAS information, second NAS information, a paging message, a second paging message, request information for establishing a second SRB, request information for establishing a second DRB, data in the second SRB, data in the second DRB, and data in a second NG connection, where the first indication information includes at least one of the following: first routing indication information, non-second routing indication information, second routing indication information, and non-first routing indication information.

Optionally, the NAS information includes at least one of the following: first NAS information and second NAS information; and/or the paging message includes at least one of the following: first information, a first paging message, and the second paging message; and/or the information about the second network includes at least one of the following: an identifier of the second network and instruction information for accessing the second network.

Optionally, the third execution module 122 is specifically configured to perform at least one of the following:
- determining a target end of NAS information transmission;
- determining that the NAS information is the second NAS information;
- transmitting the second NAS information to a proxy network element or a network element of the second network;
- transmitting the second NAS information and the first information to a terminal;

transmitting the NAS information and the first information to the terminal;

determining that the paging message is the second paging message;

transmitting the second paging message to the terminal, where the second paging message includes the first information;

transmitting the paging message to the terminal, where the paging message includes the first information;

selecting a proxy network element of the second network or a network element of the second network for the terminal;

requesting the selected network element or proxy network element of the second network to establish the second NG connection;

establishing the second SRB for the terminal or transmitting configuration information of the second SRB to the terminal;

transmitting configuration information of the second SRB and the first information to the terminal;

establishing the second DRB for the terminal or transmitting configuration information of the second DRB to the terminal;

transmitting the configuration information of the second DRB and the first information to the terminal;

transmitting the data in the second SRB or the data in the second DRB to the second NG connection;

transmitting the data in the second NG connection to the second SRB or the second DRB;

determining that the NAS information is the first NAS information;

transmitting the second NAS information to a network element of the first network;

determining that the paging message is the first paging message; and transmitting the first paging message to the terminal, where the first paging message includes the first information.

Optionally, the first obtaining module 121 is specifically configured to obtain the second information from at least one of the following:

a terminal, a second communications device, a second communications network element, and a network element and a proxy network element of the second network.

The third communications device 120 can implement the processes implemented by the first communications network element in the method embodiment in FIG. 5 of this disclosure, with the same beneficial effects achieved. To avoid repetition, details are not described herein again.

Figure 13:
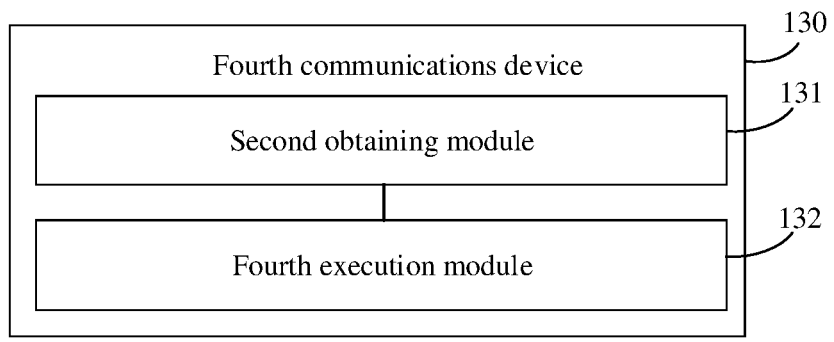
FIG. 13 is a structural diagram of a fourth communications device according to some embodiments of this disclosure.

FIG. 13 is a structural diagram of a fourth communications device according to some embodiments of this disclosure. As shown in FIG. 13, the fourth communications device 130 includes:

a second obtaining module 131, configured to obtain third information; and a fourth execution module 132, configured to perform, based on the third information, a fourth operation of accessing a second network through a first network, where the third information includes at least one of the following: information about the second network, first indication information, NAS information, a paging message, a second paging message, configuration information of an SRB, configuration information of a second SRB, configuration information of a DRB, configuration information of a second DRB, data in the second SRB, and data in the second DRB, where the first indication information includes at least one of the following: first routing indication information, non-second routing indication information, second routing indication information, and non-first routing indication information.

Optionally, the NAS information includes at least one of the following: first NAS information and second NAS information; and/or the configuration information of the SRB includes at least one of the following: configuration information of a first SRB and the configuration information of the second SRB; and/or the configuration information of the DRB includes at least one of the following: configuration information of a first DRB and the configuration information of the second DRB; and/or the information about the second network includes at least one of the following: an identifier of the second network and instruction information for accessing the second network.

Optionally, the fourth execution module 132 is specifically configured to perform at least one of the following:

determining that the NAS information is the second NAS information;

determining that the SRB is the second SRB;

transmitting and/or receiving related information between a terminal and the second network through the second SRB;

transmitting and/or receiving the second NAS information through the second SRB;

determining that the DRB is the second DRB;

transmitting and/or the receiving related information between the terminal and the second network through the second DRB;

transmitting and/or receiving the second NAS information through the second DRB;

determining that the NAS information is the first NAS information;

determining that the SRB is the first SRB;

transmitting and/or receiving related information between the terminal and the first network through the first SRB; and transmitting and/or receiving the first NAS information through the first SRB.

The fourth communications device 130 can implement the processes implemented by the terminal in the method embodiment in FIG. 6 of this disclosure, with the same beneficial effects achieved. To avoid repetition, details are not described herein again.

Optionally, some embodiments of this disclosure further provide a first communications device, including a memory, a processor, and a program stored in the memory and capable of running on the processor. When the program is executed by the processor, the processes of the method for controlling network access in the embodiment in FIG. 3 are implemented, with the same technical effects achieved. To avoid repetition, details are not described herein again.

Some embodiments of this disclosure further provide a second communications device, including a memory, a processor, and a program stored in the memory and capable of running on the processor. When the program is executed by the processor, the processes of the method for controlling network access in the embodiment in FIG. 4 are implemented, with the same technical effects achieved. To avoid repetition, details are not described herein again.

Some embodiments of this disclosure further provide a third communications device, including a memory, a processor, and a program stored in the memory and capable of running on the processor. When the program is executed by the processor, the processes of the method for controlling network access in the embodiment in FIG. 5 are implemented, with the same technical effects achieved. To avoid repetition, details are not described herein again.

Some embodiments of this disclosure further provide a fourth communications device, including a memory, a processor, and a program stored in the memory and capable of running on the processor. When the program is executed by the processor, the processes of the method for controlling network access in the embodiment in FIG. 6 are implemented, with the same technical effects achieved. To avoid repetition, details are not described herein again.

Figure 14:
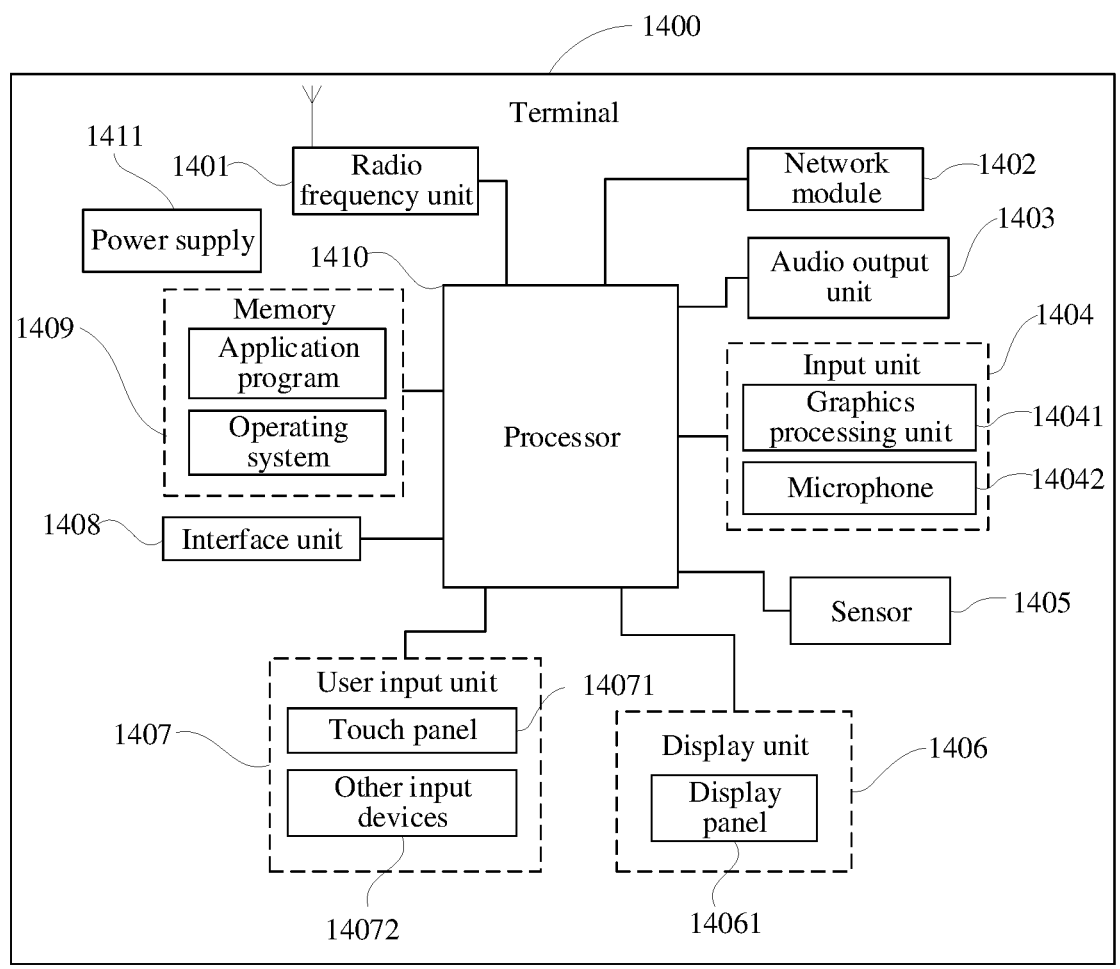
FIG. 14 is a structural diagram of a terminal according to some embodiments of this disclosure.

Specifically, FIG. 14 is a schematic diagram of a hardware structure of a terminal for implementing the embodiments of this disclosure. The terminal 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411. A person skilled in the art may understand that the terminal structure shown in FIG. 14 does not constitute a limitation to the terminal. The terminal may include more or fewer components than those shown in the figure, or some components may be combined, or there may be a different component layout. In some embodiments of this disclosure, the terminal includes but is not limited to a mobile phone, a tablet computer, a laptop computer, a palmtop computer, an in-vehicle terminal, a wearable device, a pedometer, and the like.

When the terminal 1400 is the first communications device corresponding to the embodiment in FIG. 3, the processor 1410 is configured to:
  determine whether a preset condition is satisfied; and
  when it is determined that the preset condition is satisfied, perform a first operation of accessing a second network through a first network.

Optionally, the processor 1410 is specifically configured to perform at least one of the following:
  transmitting first information;
  transmitting request information for establishing a second signaling radio bearer SRB;
  transmitting request information for establishing a second data radio bearer DRB;
  transmitting second NAS information through the second SRB or the second DRB; and
  transmitting related information between the terminal and the second network through the second SRB or the second DRB,
  where the first information includes at least one of the following: information about the second network, first indication information, and NAS information,
  where the first indication information includes at least one of the following: first routing indication information, non-second routing indication information, second routing indication information, and non-first routing indication information.

Optionally, the preset condition is at least one of the following:
  there is a requirement for interaction between the terminal and the second network;
  there is a requirement for transmitting related information between the terminal and the second network;
  there is a requirement for transmitting the second NAS information;
  there is a requirement for accessing the second network;
  there is first network coverage but no second network coverage; and
  a current location is covered by the first network but not covered by the second network.

When the terminal 1400 is the fourth communications device corresponding to the embodiment in FIG. 6, the processor 1410 is configured to:
  obtain third information; and
  perform, based on the third information, a fourth operation of accessing a second network through a first network,
  where the third information includes at least one of the following: information about the second network, first indication information, NAS information, a paging message, a second paging message, configuration information of an SRB, configuration information of a second SRB, configuration information of a DRB, configuration information of a second DRB, data in the second SRB, and data in the second DRB,
  where the first indication information includes at least one of the following: first routing indication information, non-second routing indication information, second routing indication information, and non-first routing indication information.

Optionally, the NAS information includes at least one of the following: first NAS information and second NAS information; and/or
  the configuration information of the SRB includes at least one of the following: configuration information of a first SRB and the configuration information of the second SRB; and/or
  the configuration information of the DRB includes at least one of the following: configuration information of a first DRB and the configuration information of the second DRB.

Optionally, the processor 1410 is specifically configured to perform at least one of the following:
  determining that the NAS information is the second NAS information;
  determining that the SRB is the second SRB;
  transmitting and/or receiving related information between the terminal and the second network through the second SRB;
  transmitting and/or receiving the second NAS information through the second SRB;
  determining that the DRB is the second DRB;
  transmitting and/or receiving the related information between the terminal and the second network through the second DRB;
  transmitting and/or receiving the second NAS information through the second DRB;
  determining that the NAS information is the first NAS information;
  determining that the SRB is the first SRB;
  transmitting and/or receiving related information between the terminal and the first network through the first SRB; and
  transmitting and/or receiving the first NAS information through the first SRB.

The terminal 1400 can implement various processes implemented by the terminal in the foregoing method embodiments and achieve the corresponding technical effects. To avoid repetition, details are not described herein again.

It should be understood that, in some embodiments of this disclosure, the radio frequency unit 1401 may be configured to transmit or receive a signal in an information transmitting/ receiving or call process. Specifically, the radio frequency unit 1401 receives downlink data from a base station and transmits the downlink data to the processor 1410 for processing; and transmits uplink data to the base station. Usually, the radio frequency unit 1401 includes but is not limited to an antenna, at least one amplifier, a transceiver, a coupler, a low noise amplifier, a duplexer, and the like. In addition, the radio frequency unit 1401 may further communicate with a network and another device by using a wireless communications system.

The terminal provides a user with wireless broadband Internet access by using the network module 1402, for example, helps the user transmit or receive an email, browse a web page, access streaming media, and the like.

The audio output unit 1403 may convert audio data into an audio signal, and output the audio signal as sound, where the audio data is received by the radio frequency unit 1401 or the network module 1402, or stored in the memory 1409. In addition, the audio output unit 1403 may further provide audio output (for example, a call signal reception tone or a message reception tone) that is related to a specific function performed by the terminal 1400. The audio output unit 1403 includes a loudspeaker, a buzzer, a phone receiver, and the like.

The input unit 1404 is configured to receive an audio signal or a video signal. The input unit 1404 may include a graphics processing unit (GPU) 14041 and a microphone 14042. The graphics processing unit 14041 processes image data of a static picture or a video that is obtained by an image capture apparatus (for example, a camera) in a video capture mode or an image capture mode. A processed image frame may be displayed on the display unit 1406. An image frame processed by the graphics processing unit 14041 may be stored in the memory 1409 (or another storage medium), or may be transmitted by the radio frequency unit 1401 or the network module 1402. The microphone 14042 may receive a sound, and can process the sound into audio data. In a phone call mode, processed audio data may be converted, for output, into a format for transmission by the radio frequency unit 1401 to a mobile communications base station.

The terminal 1400 further includes at least one sensor 1405, for example, an optical sensor, a motion sensor, and another sensor. Specifically, the optical sensor includes an ambient light sensor and a proximity sensor. The ambient light sensor may adjust brightness of a display panel 14061 based on intensity of ambient light. When the terminal 1400 moves near an ear, the proximity sensor may disable the display panel 14061 and/or backlight. As a motion sensor, an accelerometer sensor may detect for a value of an acceleration in various directions (there are usually three axes), may detect for a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 1405 may further include a fingerprint sensor, a pressure sensor, an iris sensor, a molecular sensor, a gyroscope, a barometer, a hygrometer, a thermometer, or an infrared sensor. Details are not described herein.

The display unit 1406 is configured to display information entered by the user or information provided for the user. The display unit 1406 may include the display panel 14061. Optionally, the display panel 14061 may be configured in a form of a liquid crystal display (LCD), an organic light-emitting diode (OLED), or the like.

The user input unit 1407 may be configured to receive entered numerical or character information, and generate key signal input that is related to a user setting and function control of the terminal. Specifically, the user input unit 1407 includes a touch panel 14071 and other input devices 14072. The touch panel 14071 is also referred to as a touchscreen, and may collect a touch operation of the user on or near the touch panel (for example, an operation performed on or near the touch panel 14071 by the user by using any appropriate object or accessory such as a finger or a stylus). The touch panel 14071 may include two parts: a touch detection apparatus and a touch controller. The touch detection apparatus detects for a touch orientation of the user, detects for a signal brought by the touch operation, and transmits the signal to the touch controller. The touch controller receives touch information from the touch detection apparatus, converts the touch information into contact coordinates, transmits the contact coordinates to the processor 1410, receives a command transmitted by the processor 1410, and executes the command In addition, the touch panel 14071 may be implemented in a plurality of types, for example, a resistive type, a capacitive type, an infrared type, and a surface acoustic wave. In addition to the touch panel 14071, the user input unit 1407 may further include the other input devices 14072. Specifically, the other input devices 14072 may include but are not limited to a physical keyboard, a function key (for example, a volume control key or a power on/off key), a track ball, a mouse, and a joystick. Details are not described herein.

Further, the touch panel 14071 may cover the display panel 14061. After detecting a touch operation on or near the touch panel 14071, the touch panel 14071 transmits the touch operation to the processor 1410 to determine a type of a touch event. Then the processor 1410 provides corresponding visual output on the display panel 14061 based on the type of the touch event. In FIG. 14, the touch panel 14071 and the display panel 14061 serve as two independent components to implement input and output functions of the terminal. However, in some embodiments, the touch panel 14071 and the display panel 14061 may be integrated to implement the input and output functions of the terminal. This is not specifically limited herein.

The interface unit 1408 is an interface for connecting an external apparatus to the terminal 1400. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, or a headset port. The interface unit 1408 may be configured to receive input (for example, data information and electric power) from the external apparatus, and transmit the received input to one or more elements in the terminal 1400; or may be configured to transmit data between the terminal 1400 and the external apparatus.

The memory 1409 may be configured to store software programs and various types of data. The memory 1409 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 1409 may include a high-speed random access memory, or may include a nonvolatile memory, for example, at least one magnetic disk storage device or a flash memory device, or another volatile solid-state storage device.

The processor 1410 is a control center of the terminal, connects various parts of the entire terminal by using various interfaces and lines, and executes various functions and data processing of the terminal by running or executing a software program and/or a module stored in the memory 1409 and invoking data stored in the memory 1409, so as to perform overall monitoring on the terminal. The processor 1410 may include one or more processing units. Optionally, the processor 1410 may integrate an application processor and a modem processor. The application processor mainly processes an operating system, a user interface, an application program, and the like. The modem processor mainly processes wireless communication. It can be understood that the modem processor may be alternatively not integrated in the processor 1410.

The terminal 1400 may further include a power supply 1411 (for example, a battery) that supplies power to each component. Optionally, the power supply 1411 may be logically connected to the processor 1410 by using a power management system, so as to implement functions such as charging management, discharging management, and power consumption management by using the power management system.

In addition, the terminal 1400 may further include some functional modules that are not shown. Details are not described herein.

Figure 15:
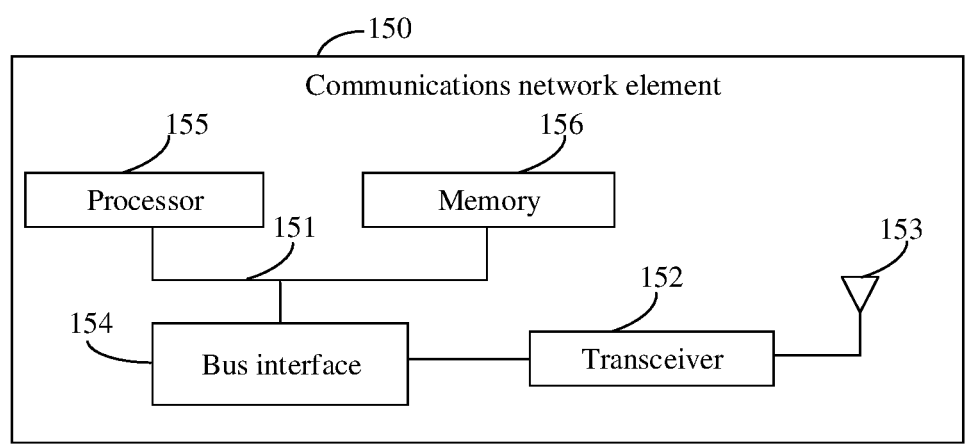
FIG. 15 is a structural diagram of a communications network element according to some embodiments of this disclosure.

FIG. 15 is a structural diagram of a communications network element according to some embodiments of this disclosure. As shown in FIG. 15, the communications network element 150 includes, but is not limited to, a bus 151, a transceiver 152, an antenna 153, a bus interface 154, a processor 155, and a memory 156.

In some embodiments of this disclosure, the communications network element 150 further includes a program that is stored in the memory 156 and capable of running on the processor 155.

When the communications network element 150 acts as the third communications device in the foregoing method embodiment, the following steps are implemented when the program 1511 is executed by the processor 152:
 obtaining second information; and
 performing, based on the second information, a third operation of accessing a second network through a first network,
 where the second information includes at least one of the following: information about the second network, first indication information, NAS information, second NAS information, a paging message, a second paging message, request information for establishing a second SRB, request information for establishing a second DRB, data in the second SRB, data in the second DRB, and data in a second NG connection,
 where the first indication information includes at least one of the following: first routing indication information, non-second routing indication information, second routing indication information, and non-first routing indication information.

Optionally, the performing a third operation of accessing a second network through a first network includes at least one of the following:
 determining a target end of NAS information transmission;
 determining that the NAS information is the second NAS information;
 transmitting the second NAS information to a proxy network element or a network element of the second network;
 transmitting the second NAS information and the first information to a terminal;
 transmitting the NAS information and the first information to the terminal;
 determining that the paging message is the second paging message;
 transmitting the second paging message to the terminal, where the second paging message includes the first information;
 transmitting the paging message to the terminal, where the paging message includes the first information;
 selecting a proxy network element of the second network or a network element of the second network for the terminal;
 requesting the selected network element or proxy network element of the second network to establish the second NG connection;
 establishing the second SRB for the terminal or transmitting configuration information of the second SRB to the terminal;
 transmitting configuration information of the second SRB and the first information to the terminal;
 establishing the second DRB for the terminal or transmitting configuration information of the second DRB to the terminal;
 transmitting the configuration information of the second DRB and the first information to the terminal;
 transmitting the data in the second SRB or the data in the second DRB to the second NG connection;
 transmitting the data in the second NG connection to the second SRB or the second DRB;
 determining that the NAS information is the first NAS information;
 transmitting the second NAS information to a network element of the first network;
 determining that the paging message is the first paging message; and
 transmitting the first paging message to the terminal, where the first paging message includes the first information.

Optionally, the obtaining second information includes:
 obtaining the second information from at least one of the following:
 the terminal, a second communications network element, and the network element and the proxy network element of the second network.

When the communications network element 150 acts as the second communications device in the foregoing method embodiment, the following steps are implemented when the program 1511 is executed by the processor 152:
 determining whether a preset condition is satisfied; and
 when it is determined that the preset condition is satisfied, performing a second operation of accessing a second network through a first network.

Optionally, the performing a second operation of accessing a second network through a first network includes at least one of the following:
 transmitting first information;
 transmitting a paging message, where the paging message includes the first information;
 transmitting the first information through a second NG connection or a third NG connection;

transmitting second NAS information or related information between a terminal and the second network through the second NG connection; and transmitting the second NAS information or the related information between the terminal and the second network through the third NG connection, where the first information includes at least one of the following: information about the second network, first indication information, and NAS information, where the first indication information includes at least one of the following: first routing indication information, non-second routing indication information, second routing indication information, and non-first routing indication information.

Optionally, the preset condition is at least one of the following:

there is a requirement for interaction between the terminal and the second network;

there is a requirement for transmitting related information between the terminal and the second network;

there is a requirement for transmitting the second NAS information; and the terminal accesses the second network through the first network or a proxy network element.

The communications network element 150 can implement various processes implemented by the second or third communications device in the foregoing method embodiments and achieve the corresponding technical effects. To avoid repetition, details are not described herein again.

The transceiver 152 is configured to transmit and receive data under control of the processor 155.

In FIG. 15, in a bus architecture (represented by the bus 151), the bus 151 may include any quantity of interconnected buses and bridges, and the bus 151 connects various circuits that include one or more processors represented by the processor 155 and a memory represented by the memory 156. The bus 151 may further connect various other circuits, such as a peripheral device, a voltage regulator, and a power management circuit. These are well-known in the art, and therefore are not further described in this specification. The bus interface 154 provides an interface between the bus 151 and the transceiver 152. The transceiver 152 may be one element, or may be a plurality of elements, for example, a plurality of receivers and transmitters, and provides a unit for communicating with various other apparatuses on a transmission medium. Data processed by the processor 155 is transmitted on a wireless medium through the antenna 153. Further, the antenna 153 receives data and transmits the data to the processor 155.

The processor 155 is responsible for managing the bus 151 and general processing, and may further provide various functions, including timing, a peripheral interface, voltage regulation, power management, and other control functions. The memory 156 may be used to store data that is used by the processor 155 when the processor 65 performs an operation.

Optionally, the processor 155 may be a CPU, an ASIC, an FPGA, or a CPLD.

Some embodiments of this disclosure further provide a computer-readable storage medium, where the computer-readable storage medium stores a computer program. When the computer program is executed by a processor, the processes in any one of the foregoing embodiments of the methods for controlling network access are implemented, with the same technical effect achieved. To avoid repetition, details are not described herein again. For example, the computer-readable storage medium is a read-only memory (ROM for short), a random access memory (RAM for short), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disk), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It can be understood that the embodiments described in the embodiments of this disclosure may be implemented by hardware, software, firmware, middleware, microcode, or a combination thereof. In case of implementation by hardware, a processing unit may be implemented in one or more application-specific integrated circuits (ASIC), digital signal processors (DSP), digital signal processing devices (DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to the specific implementations. The specific implementations are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A method for controlling network access, applied to a first communications device, comprising:
determining whether a preset condition is satisfied; and
when it is determined that the preset condition is satisfied, performing a first operation of accessing a second network through a first network;
wherein the performing a first operation of accessing a second network through a first network comprises:
transmitting first information;
wherein the first information comprises: first indication information and non-access stratum, NAS, information, or the first information comprises: second NAS information,
wherein the first indication information comprises at least one of the following: first routing indication information, non-second routing indication information, second routing indication information, and non-first routing indication information;
wherein the NAS information comprises at least one of the following: first NAS information and the second NAS information;
wherein the first routing indication information or the non-second routing indication information comprises at least one of the following: indication information of the first network, indication information of the first NAS information, indication information of a first signaling radio bearer, SRB, indication information of a first data radio bearer, DRB, indication information of a first next generation, NG connection, indication information of a first access management function, AMF, and indication information of a first user plane function, UPF;
wherein the second routing indication information or the non-first routing indication information may include at least one of the following: indication information of the second network, indication information of the second NAS information, indication information of a second SRB, indication information of a second DRB, indication information of a second NG connection, indication information of a second AMF, indication information of a second UPF, and indication information of a proxy network element;
wherein the second NAS information is control information between the terminal and the second network, and the first NAS information is control information between the terminal and the first network;
wherein the first NAS information and/or the second NAS information are transmitted in a same NAS information element;
or,
wherein the second NAS information is transmitted through a second NAS information element, and the second NAS information element is used to identify the second NAS information.

2. The method according to claim 1, wherein the performing a first operation of accessing a second network through a first network comprises at least one of the following:
transmitting request information for establishing a second signaling radio bearer SRB;
transmitting request information for establishing a second data radio bearer DRB;
transmitting second non-access stratum NAS information through the second SRB or the second DRB; and
transmitting related information between a terminal and the second network through the second SRB or the second DRB.

3. The method according to claim 2, wherein the first information further comprises information about the second network;
the information about the second network comprises at least one of the following: an identifier of the second network and instruction information for accessing the second network.

4. The method according to claim 1, wherein the preset condition is at least one of the following:
- there is a requirement for interaction between the terminal and the second network;
- there is a requirement for transmitting the related information between the terminal and the second network;
- there is a requirement for transmitting the second NAS information;
- there is a requirement for accessing the second network;
- there is a requirement for communicating with a second communications device that has accessed the first network;
- there is first network coverage but no second network coverage; and
- a current location is covered by the first network but not covered by the second network.

5. The method according to claim 2, wherein the second SRB, the second DRB, and the second NAS information are related to the second network.

6. The method according to claim 1, wherein the second network is at least one of the following: a second access management function AMF of the first network, a part of the first network, and a slice of the first network.

7. A method for controlling network access, applied to a second communications device, comprising:
- determining whether a preset condition is satisfied; and
- when it is determined that the preset condition is satisfied, performing a second operation of accessing a second network through a first network;
- wherein the performing a second operation of accessing a second network through a first network comprises:
- transmitting first information;
- wherein the first information comprises first indication information and NAS information, or the first information comprises: the second NAS information,
- wherein the first indication information comprises at least one of the following: first routing indication information, non-second routing indication information, second routing indication information, and non-first routing indication information;
- wherein the NAS information comprises at least one of the following: first NAS information and the second NAS information;
- wherein the first routing indication information or the non-second routing indication information comprises at least one of the following: indication information of the first network, indication information of the first NAS information, indication information of a first SRB, indication information of a first DRB, indication information of a first NG connection, indication information of a first AMF, and indication information of a first UPF;
- wherein the second routing indication information or the non-first routing indication information may include at least one of the following: indication information of the second network, indication information of the second NAS information, indication information of a second SRB, indication information of a second DRB, indication information of a second NG connection, indication information of a second AMF, indication information of a second UPF, and indication information of a proxy network element;
- wherein the second NAS information is control information between the terminal and the second network and the first NAS information is control information between the terminal and the first network.

8. The method according to claim 7, wherein the performing a second operation of accessing a second network through a first network comprises at least one of the following:
- transmitting a paging message, wherein the paging message comprises the first information;
- transmitting the first information through a second next generation NG connection or a third NG connection;
- transmitting second NAS information or related information between a terminal and the second network through the second NG connection; and
- transmitting the second NAS information or the related information between the terminal and the second network through the third NG connection.

9. The method according to claim 8, the first information further comprises information about the second network,
- wherein the information about the second network comprises at least one of the following: an identifier of the second network and instruction information for accessing the second network.

10. The method according to claim 7, wherein the preset condition is at least one of the following:
- there is a requirement for interaction between the terminal and the second network;
- there is a requirement for transmitting the related information between the terminal and the second network;
- there is a requirement for transmitting the second NAS information; and
- the terminal accesses the second network through the first network or a proxy network element.

11. The method according to claim 8, wherein
- the second NG connection is a control plane connection, for the terminal, between a first-network element and a second-network element or a proxy network element;
- the third NG connection is a control plane connection, for the terminal, between second-network elements or proxy network elements;
- the first routing indication information and the non-second routing indication information are related to the first network; and
- the second routing indication information and the non-first routing indication information are related to the second network.

12. A method for controlling network access, applied to a third communications device, comprising:
- obtaining second information; and
- performing, based on the second information, a third operation of accessing a second network through a first network,
- wherein the second information comprises first indication information and NAS information, or the second information comprises: second NAS information,
- wherein the first indication information comprises at least one of the following: first routing indication information, non-second routing indication information, second routing indication information, and non-first routing indication information;
- wherein the NAS information comprises at least one of the following: first NAS information and the second NAS information;
- wherein the first routing indication information or the non-second routing indication information comprises at least one of the following: indication information of the first network, indication information of the first NAS information, indication information of a first SRB, indication information of a first DRB, indication information of a first NG connection, indication information of a first AMF, and indication information of a first UPF;

wherein the second routing indication information or the non-first routing indication information may include at least one of the following: indication information of the second network, indication information of the second NAS information, indication information of a second SRB, indication information of a second DRB, indication information of a second NG connection, indication information of a second AMF, indication information of a second UPF, and indication information of a proxy network element;

wherein the second NAS information is control information between the terminal and the second network and the first NAS information is control information between the terminal and the first network.

13. The method according to claim 12,
wherein the second information further comprises request information for establishing a second SRB, request information for establishing a second DRB, data in the second SRB, data in the second DRB, data in a second NG connection and information about the second network;

wherein the information about the second network comprises at least one of the following:

an identifier of the second network and instruction information for accessing the second network.

14. The method according to claim 12, wherein the performing a third operation of accessing a second network through a first network comprises at least one of the following:

determining a target end of NAS information transmission;

determining that the NAS information is the second NAS information;

transmitting the second NAS information to a proxy network element or a network element of the second network;

transmitting the second NAS information and the first information to a terminal;

transmitting the NAS information and the first information to the terminal;

determining that the paging message is the second paging message;

transmitting the second paging message to the terminal, wherein the second paging message comprises the first information;

transmitting the paging message to the terminal, wherein the paging message comprises the first information;

selecting a proxy network element of the second network or a network element of the second network for the terminal;

requesting the selected network element or proxy network element of the second network to establish the second NG connection;

establishing the second SRB for the terminal or transmitting configuration information of the second SRB to the terminal;

transmitting the configuration information of the second SRB and the first information to the terminal;

establishing the second DRB for the terminal or transmitting configuration information of the second DRB to the terminal;

transmitting the configuration information of the second DRB and the first information to the terminal;

transmitting the data in the second SRB or the data in the second DRB to the second NG connection;

transmitting the data in the second NG connection to the second SRB or the second DRB;

determining that the NAS information is the first NAS information;

transmitting the second NAS information to a network element of the first network;

determining that the paging message is the first paging message; and transmitting the first paging message to the terminal, wherein the first paging message comprises the first information.

15. The method according to claim 12, wherein the obtaining second information comprises:

obtaining the second information from at least one of the following:

a terminal, a second communications device, a second communications network element, and a network element and a proxy network element of the second network.

16. The method according to claim 12, wherein the first routing indication information and the non-second routing indication information are related to the first network;

the second SRB, the second DRB, the second paging message, the second NAS information, the second routing indication information, and the non-first routing indication information are related to the second network; and the second NG connection is a control plane connection, for a terminal, between a first-network element and a second-network element or a proxy network element.

17. A first communications device, comprising: a memory, a processor, and a program stored in the memory and capable of running on the processor, wherein when the program is executed by the processor, the processor is configured to perform steps of the method for controlling network access according to claim 1.

18. The first communications device according to claim 17, wherein the first NAS information and/or the second NAS information are transmitted in a same NAS information element;

or, wherein the second NAS information is transmitted through a second NAS information element, and the second NAS information element is used to identify the second NAS information.

19. A second communications device, comprising: a memory, a processor, and a program stored in the memory and capable of running on the processor, wherein when the program is executed by the processor, the processor is configured to perform steps of the method for controlling network access according to claim 7.

20. A third communications device, comprising: a memory, a processor, and a program stored in the memory and capable of running on the processor, wherein when the program is executed by the processor, the processor is configured to perform steps of the method for controlling network access according to claim 12.

* * * * *